(12) United States Patent (10) Patent No.: US 9,381,940 B2
Gale (45) Date of Patent: Jul. 5, 2016

(54) SYSTEM AND METHOD FOR VEHICLE CHASSIS CONTROL

(75) Inventor: David Andrew Gale, London (GB)

(73) Assignee: David Andrew Gale, London (GB)

( * ) Notice: Subject to any disclaimer, the term of this patent is extended or adjusted under 35 U.S.C. 154(b) by 0 days.

(21) Appl. No.: 14/131,405

(22) PCT Filed: Jun. 29, 2012

(86) PCT No.: PCT/GB2012/051519
§ 371 (c)(1),
(2), (4) Date: Mar. 24, 2014

(87) PCT Pub. No.: WO2013/005007
PCT Pub. Date: Jan. 10, 2013

(65) Prior Publication Data
US 2014/0312580 A1 Oct. 23, 2014

(30) Foreign Application Priority Data

Jul. 7, 2011 (GB) .................................. 1111638.1

(51) Int. Cl.
*B62D 9/02* (2006.01)
*B60G 21/073* (2006.01)
(Continued)

(52) U.S. Cl.
CPC .. *B62D 9/02* (2013.01); *B60G 3/08* (2013.01); *B60G 3/20* (2013.01); *B60G 21/073* (2013.01);
(Continued)

(58) Field of Classification Search
CPC combination set(s) only.
See application file for complete search history.

(56) References Cited

U.S. PATENT DOCUMENTS 2,184,202 A * 12/1939 Tschanz ................. B60G 21/06
267/186
4,351,410 A 9/1982 Townsend
(Continued)

FOREIGN PATENT DOCUMENTS

AU 1467183 A 5/1983
CN 201023543 Y 2/2008
(Continued)

OTHER PUBLICATIONS

"Suspension Geometry and Computation," J.C. Dixon, 2009 John Wiley & Sons, Ltd., p. 12. Fig. 1.5.3 Broulhiet ball-spline sliding pillar independent suspension.
(Continued)

*Primary Examiner* — Nicole Verley
(74) *Attorney, Agent, or Firm* — Conley Rose, P.C.

(57) ABSTRACT

There is provided a vehicle comprising a chassis, two surface-engaging front wheels, at least one surface-engaging rear wheel and a propulsion unit for driving either the front wheels or the rear wheel or wheels. Each front wheel being connected to the chassis by means of a front wheel support assembly, wherein the front wheel support assembly comprises a hydraulic cylinder associated with each front wheel. Each hydraulic cylinder comprises a housing connected to one of the chassis and the front wheel support assembly, and a piston connected to the other of the front wheel support assembly and the chassis. The piston is moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings to enable the vehicle to tilt.

14 Claims, 26 Drawing Sheets

(51) Int. Cl.
*B60G 21/10* (2006.01)
*B62K 5/10* (2013.01)
*B62K 21/00* (2006.01)
*B60G 3/08* (2006.01)
*B60G 3/20* (2006.01)
*B62D 31/00* (2006.01)
*B62K 5/00* (2013.01)

(52) U.S. Cl.
CPC ............ *B60G 21/106* (2013.01); *B62D 31/003* (2013.01); *B62K 5/10* (2013.01); *B62K 21/00* (2013.01); *B60G 2200/132* (2013.01); *B60G 2200/144* (2013.01); *B60G 2202/413* (2013.01); *B60G 2202/416* (2013.01); *B60G 2204/82* (2013.01); *B60G 2204/8304* (2013.01); *B60G 2300/13* (2013.01); *B60G 2300/45* (2013.01); *B62K 2005/001* (2013.01)

(56) References Cited

U.S. PATENT DOCUMENTS

| | | | |
|---|---|---|---|
| 5,778,671 | A | 7/1998 | Bloomquist et al. |
| 7,350,793 | B2* | 4/2008 | Munday ................ B60G 21/06 280/124.106 |
| 7,487,985 | B1* | 2/2009 | Mighell ................ B62K 5/027 180/210 |
| 7,946,596 | B2* | 5/2011 | Hsu .......................... B62H 1/12 280/5.509 |
| 8,249,775 | B2* | 8/2012 | Van Den Brink ........ B62K 5/10 180/210 |
| 8,286,978 | B2* | 10/2012 | Marabese .......... B60G 17/0162 280/124.103 |
| 8,967,629 | B2* | 3/2015 | Oshita ................ B60G 17/0432 280/124.106 |
| 2005/0212247 | A1* | 9/2005 | Rautenbach ......... B60G 17/033 280/124.16 |
| 2006/0091635 | A1* | 5/2006 | Cook ...................... B60G 3/06 280/124.106 |
| 2007/0126199 | A1* | 6/2007 | Peng .................... B60G 21/007 280/124.103 |
| 2007/0193803 | A1 | 8/2007 | Geiser |
| 2007/0262549 | A1* | 11/2007 | Haerr .................. B60G 21/007 280/124.103 |
| 2008/0012262 | A1* | 1/2008 | Carabelli ............... B60G 7/006 280/124.106 |
| 2008/0238005 | A1 | 10/2008 | James |
| 2010/0007109 | A1* | 1/2010 | Mighell ................ B62K 5/027 280/124.103 |
| 2010/0032915 | A1 | 2/2010 | Hsu et al. |
| 2010/0324808 | A1 | 12/2010 | Moulene et al. |
| 2011/0148052 | A1* | 6/2011 | Quemere ............. B60G 17/005 280/6.15 |
| 2012/0242057 | A1* | 9/2012 | Glover .................. B60G 21/06 280/124.158 |
| 2013/0068550 | A1* | 3/2013 | Gale ..................... B60G 3/145 180/216 |
| 2014/0312580 | A1 | 10/2014 | Gale |

FOREIGN PATENT DOCUMENTS

| | | |
|---|---|---|
| DE | 1947232 A1 | 4/1971 |
| DE | 4035128 A1 | 6/1992 |
| DE | 9414724 U1 | 12/1995 |
| DE | 10227417 A1 | 2/2004 |
| DE | 102009056105 A1 | 6/2010 |
| EP | 1437324 A1 | 7/2004 |
| FR | 2646379 A1 | 4/1989 |
| FR | 2646379 A1 | 11/1990 |
| GB | 1561253 A | 2/1980 |
| GB | 2476807 A | 7/2011 |
| GB | 2492757 A | 1/2013 |
| JP | S4938318 A | 4/1974 |
| JP | S56500769 A | 6/1981 |
| JP | S5741278 A | 3/1982 |
| JP | H11197191 A | 7/1999 |
| JP | 2009544509 A | 12/2009 |
| WO | 81/00088 A1 | 1/1981 |
| WO | 99/41096 A1 | 8/1999 |
| WO | 99/47372 A1 | 9/1999 |
| WO | 9961302 A1 | 12/1999 |
| WO | 0018597 A1 | 4/2000 |
| WO | 2004056645 A1 | 7/2004 |
| WO | 2005075278 A1 | 8/2005 |
| WO | 2008011917 A1 | 1/2008 |
| WO | 2008065436 A1 | 6/2008 |
| WO | 2008150173 A2 | 12/2008 |
| WO | 2009/106978 A1 | 9/2009 |
| WO | 2011/005945 A1 | 1/2011 |
| WO | 2011083335 A2 | 7/2011 |
| WO | 2013/005007 A1 | 1/2013 |

OTHER PUBLICATIONS

U.K. Intellectual Property Office Search Report under Section 17(5), dated Nov. 8, 2011, including Observations under Section 21, received from a third party.
Third Party Observation for corresponding European Application No. EP 20120732860 filed Jun. 29, 2012.
PCT Written Opinion of the International Searching Authority for International Application No. PCT/GB2012/051519, International Filing Date Jun. 29, 2012.
Japanese Office Action dated Oct. 29, 2014, for Application No. JP 2012-547548, and English translation.
EP Communication regarding Third Party Observations dated May 17, 2013, for EP Application No. 11700575.1.
Bienvenue sur www.troisroues.com.
EP Examination Report dated May 8, 2015 for European Application No. 12732860.7.
UKIPO Search Report dated Apr. 13, 2011 for UK Application No. GB1100226.8.
UKIPO Search Report dated Oct. 21, 2015 for UK Application No. GB1111638.1.

* cited by examiner

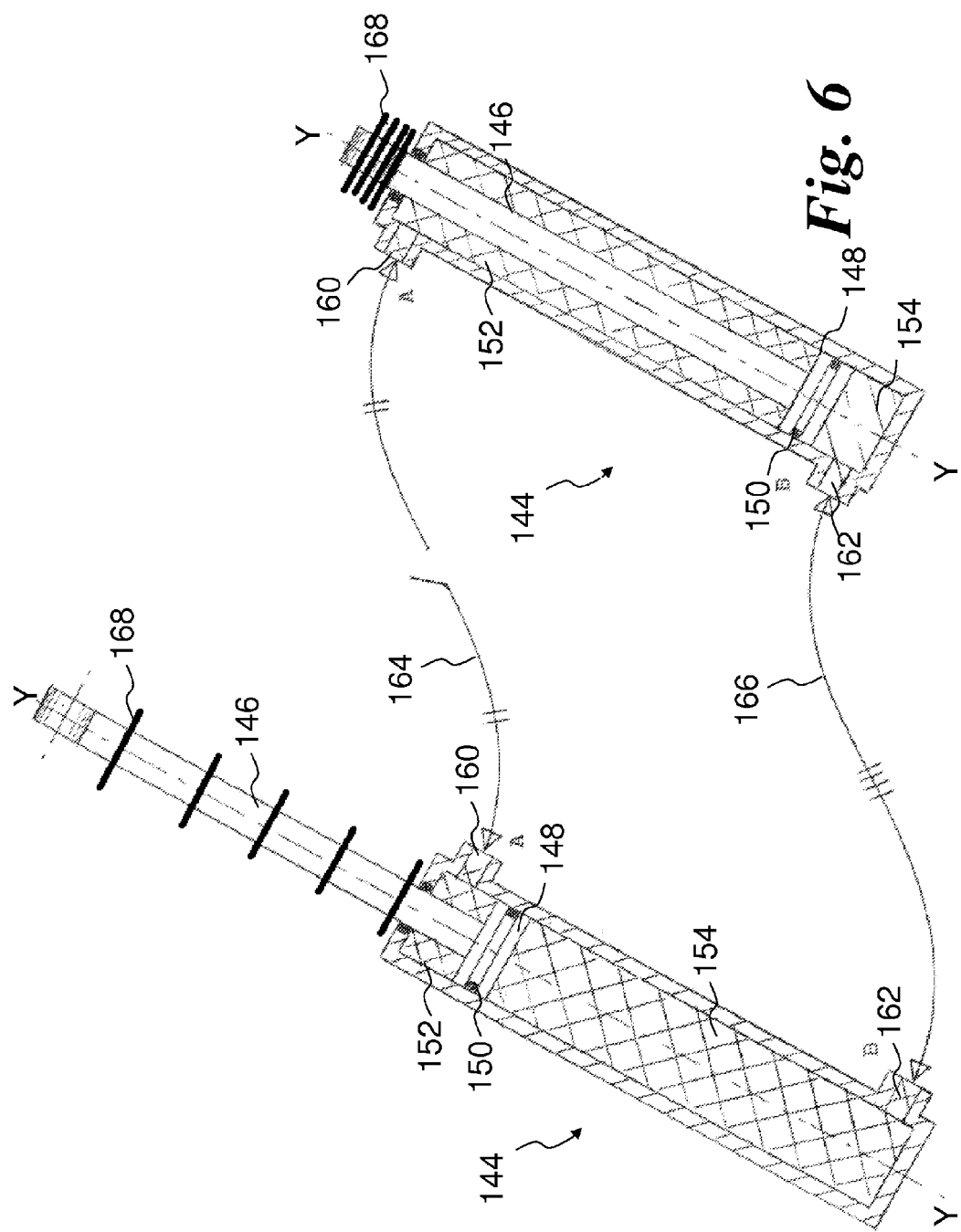

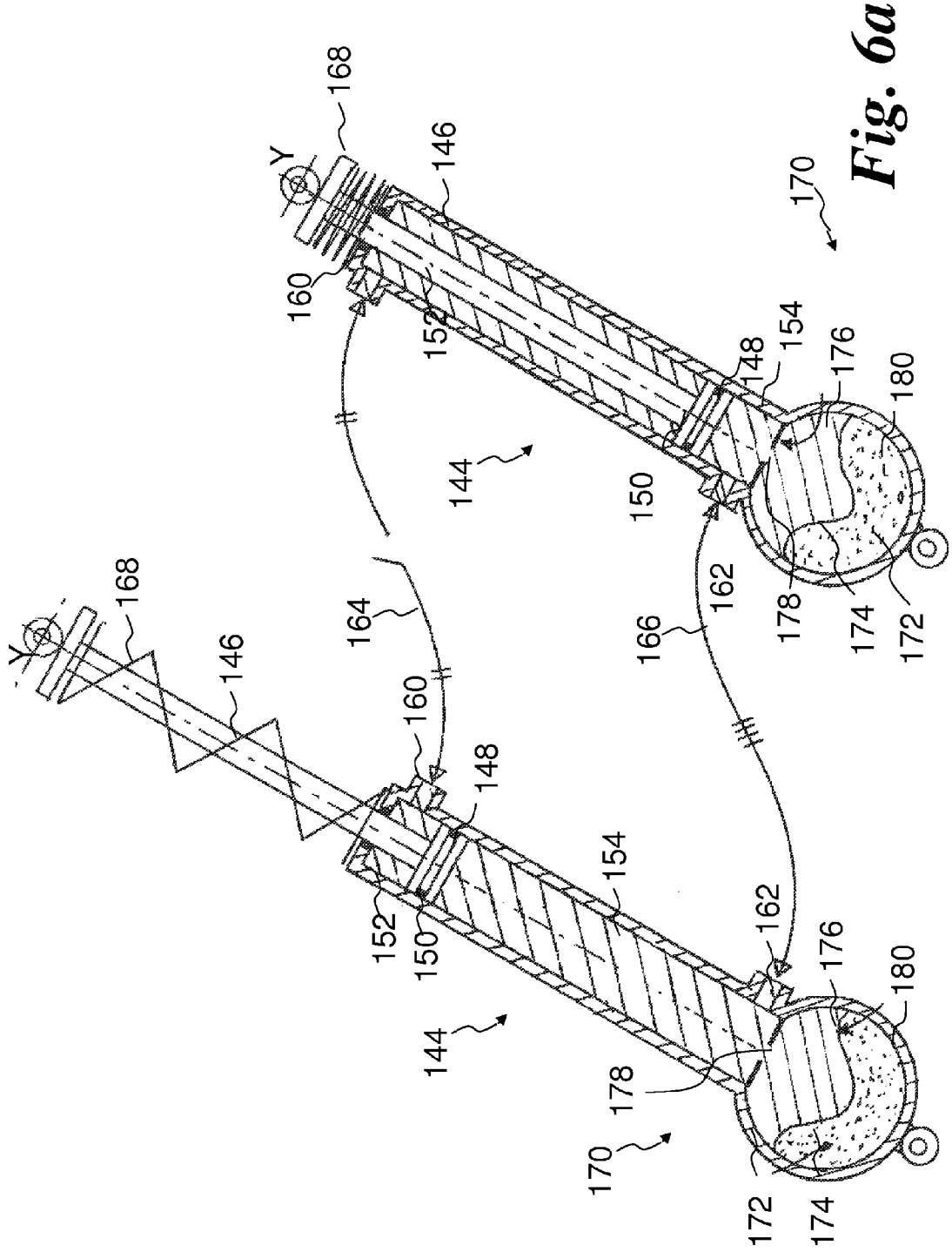

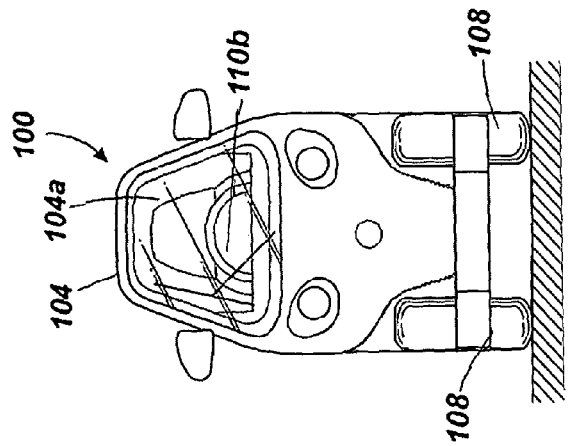
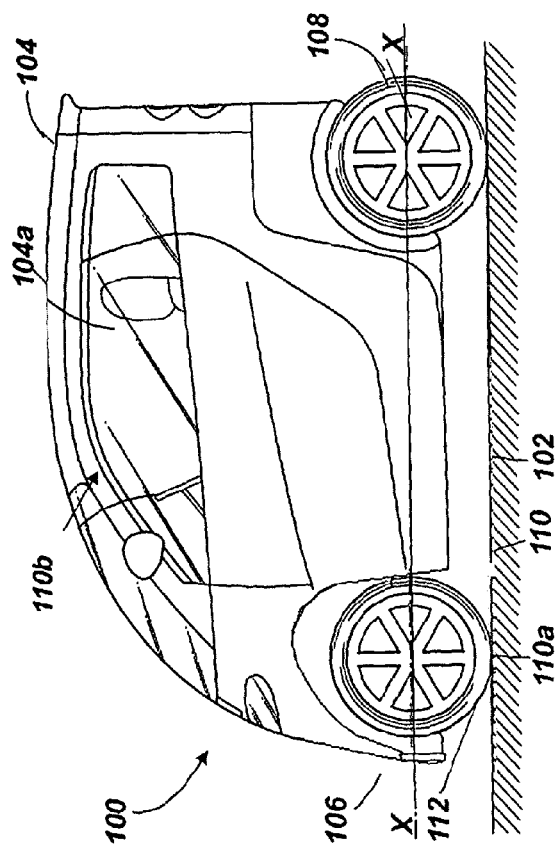
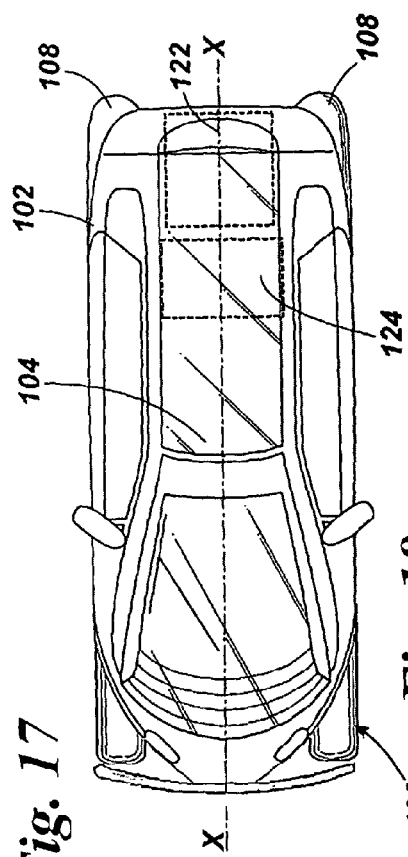

SYSTEM AND METHOD FOR VEHICLE CHASSIS CONTROL

CROSS-REFERENCE TO RELATED APPLICATIONS

This application is the U.S. National Stage under 35 U.S.C. §371 of International Patent Application No. PCT/GB2012/051519, filed Jun. 29, 2012, and entitled "A Vehicle," which claims priority to Application No. GB 1111638.1, filed Jul. 7, 2011, all of which are hereby incorporated by reference in their entireties for all purposes.

BACKGROUND

The present disclosure relates to a vehicle. Particularly, but not exclusively, the present disclosure relates to a tilting vehicle.

As is well known, the amount of road traffic is increasing annually. Much of the increase is due to the increased numbers of passenger cars. Vehicle manufacturers have responded to these problems in part by offering small ("compact" or "sub-compact") cars. Steadily increasing fuel prices also encourage the use of small cars. There is a limit to the minimum size for a car having conventional seating, motor and wheel arrangements.

A two wheel motor cycle is an alternative to a conventional four wheel car. However, motor cycles have certain drawbacks including safety aspects, a limited luggage-carrying capacity and poor weather protection and the fact that the motorcycle needs to be supported when stationary.

There have been many proposals for three wheel vehicles, whether with two wheels at the front and one wheel at the back or with one wheel at the front and two wheels at the back. Alternatively, very narrow four wheeled vehicles have also been proposed. In a turn, a vehicle experiences an effective force (the "centrifugal force") which tends to cause the vehicle to roll outwards in a turn. This is not normally a problem in a four wheel vehicle owing to the inherent stability of such vehicles nor is it a particular problem in a motor cycle as the motor cycle is leant into a corner to provide a balance between gravitational and centrifugal forces in a turn.

However, a narrow vehicle with a common hub axle to the rear wheels does not have the inherent stability in a turn of a conventional, wider vehicle. Accordingly, there have been many prior proposals for providing a narrow vehicle which tilts into a corner in order to counteract the centrifugal force.

An example of such a vehicle is shown in US 2008/0238005 to James. This document discloses, in one embodiment, a three-wheeled vehicle having rear cross arms forming a parallelogram shape which extend across the width of the vehicle between the rear wheels. The vehicle chassis, together with the vehicle rear wheels, can be tilted by skewing the parallelogram-shaped cross arms in one direction or the other to assist the vehicle during cornering. This document also discloses a mechanical front parallelogram tilting arrangement in an embodiment which comprises a pair of front wheels together with a single rear wheel.

An alternative construction of tilting vehicle is disclosed in GB 2444250 to Shotter. This document discloses a tilting vehicle with a hydraulic damper arrangement connected to the rear wheels. The hydraulic dampers on each wheel are mechanically connected by a cross bar. In one mode of operation, the dampers operate independently of one another, the tilting operation being achieved through the movement of the cross bar. In another mode of operation, the dampers are interconnected and arranged to move in the same direction to prevent differential movement. GB 2444250 relates to a narrow-track vehicle without a fully-enclosed cabin. However, the disclosed arrangement is structurally complex and the rider-controlled lean and splayed front swingarm suspension arrangement is considered unsuitable for a heavier, fully enclosed two-seater vehicle at high speed and under braking.

A further alternative construction of tilting vehicle is disclosed in WO99/61302 to Jackson. In one embodiment, a three wheel vehicle is shown and described which has a pair of rear suspension struts, each carrying a rear wheel. The struts provide suspension functions together with enabling the vehicle to tilt.

Other known tilting mechanisms for three wheel vehicles rely on the rider/driver deliberately actuating levers which are connected to a mechanism to make the vehicle tilt; such mechanisms are often heavy and require the driver to learn how to operate the levers as such lever operated mechanisms are not at all intuitive.

An example of a four wheeled tilting vehicle is disclosed in WO-A-2006/003489 to Moulene. In this document, a purely mechanical tilting front wheel arrangement is disclosed. A further example is given in EP1702773 to Harty and Kemp.

Accordingly, there is a perceived need to provide a fully enclosed vehicle which can be small, preferably with three or four wheels, and which can tilt into a turn either by virtue of a familiar, passive mechanism which is easy and preferably intuitive for the driver to operate, or by intuitive electronic control.

Further, narrow passenger vehicles comprise, by their very nature, extremely limited interior space. In known arrangements, the space between the rear wheels of these vehicles is taken up with the mechanisms to enable the vehicle to tilt. Therefore, there exists a technical problem that known tilting narrow passenger vehicles do not make efficient use of the available space within the vehicle.

BRIEF SUMMARY OF THE DISCLOSURE

According to a first aspect of the present disclosure, there is provided a vehicle comprising a chassis, two surface-engaging front wheels, at least one surface-engaging rear wheel and a propulsion unit for driving either the front wheels or the rear wheel or wheels, each front wheel being connected to the chassis by means of a front wheel support assembly, wherein the front wheel support assembly comprises a hydraulic cylinder associated with each front wheel, each hydraulic cylinder comprising: a housing connected to one of the chassis and the front wheel support assembly; and a piston connected to the other of the front wheel support assembly and the chassis, the piston being moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings to enable the vehicle to tilt.

By providing such an arrangement, the vehicle can be caused to tilt from the use of a hydraulic arrangement on the front wheels. This provides a compact and space-efficient mechanism for enabling a vehicle to be tilted in order to navigate turns.

In one embodiment, the chassis further comprises a central member movable therewith and the front wheel assembly further comprising; an upper support member independently pivotably connected to the central member and to a respective wheel hub; and a lower support member independently pivotably connected to the central member and to a respective wheel hub.

In one embodiment, each upper support member comprises a wishbone arrangement. In one embodiment, each lower support member comprises a wishbone arrangement.

In one embodiment, each upper support member comprises two independently movable sections, each section being connected between a hub and the central member. In one embodiment, each lower support member comprises two independently movable sections, each section being connected between a hub and the central member.

In one embodiment, each upper support member comprises a single member extending between wheel hubs. In one embodiment, each lower support member comprises a single member extending between wheel hubs.

In one embodiment, a control device is provided to enable a user to steer the vehicle and the control device is connected to the wheel hubs by means of one or more pairs of linkage arms or hydraulic connection. In one embodiment, the control device is connected to a steering column, the steering column being connected to the linkage arms by means of a gear linkage.

In one embodiment, the control device is selectively disengageable such that the front wheels are free to castor. In one embodiment, the control device is selectively disengageable by means of a clutch.

In one embodiment, the vehicle further comprises two surface-engaging rear wheels, each rear wheel being connected to the chassis by a rear wheel support assembly comprising: a rear wheel support for allowing movement of the respective rear wheel relative to the chassis; and a rear hydraulic cylinder, the rear hydraulic cylinder comprising: a housing connected to one of the chassis and the rear wheel support: and a piston connected to the other of the rear wheel support and the chassis, the piston being moveable within the housing and arranged to divide the hydraulic cylinder into first and second chambers each having respective ports arranged to allow hydraulic fluid to enter and exit the respective chamber, the ports of the first chambers of each rear hydraulic cylinder being in fluid communication and the ports of the second chambers of each rear hydraulic cylinder being in fluid communication such that movement of hydraulic fluid from the first or second chamber of one rear hydraulic cylinder to the respective first or second chamber of the other rear hydraulic cylinder displaces the pistons of the rear hydraulic cylinders in opposing directions relative to the respective housings.

In one embodiment, the front hydraulic cylinders and the rear hydraulic cylinders share a common hydraulic circuit. In one embodiment, the front hydraulic cylinders and the rear hydraulic cylinders utilise separate hydraulic circuits.

In one embodiment, the front hydraulic cylinders and the rear hydraulic cylinders are controlled by a common controller. In one embodiment, each rear hydraulic cylinder further comprises a hydro-pneumatic damper.

In one embodiment, each hydro-pneumatic damper comprises a chamber and a flexible membrane, the flexible membrane dividing the chamber into a hydraulic portion and a hydro-pneumatic portion.

In one embodiment, the hydraulic portion is in fluid communication with the interior of the respective hydraulic cylinder. In one embodiment, the hydro-pneumatic portion comprises Nitrogen gas.

In one embodiment, at least one hydraulic cylinder further comprises resilient means arranged to bias the vehicle towards the upright position. In one embodiment, the resilient means comprises a coil spring. In one embodiment, the coil spring is located on the hydraulic or hydro-pneumatic cylinder.

In one embodiment, the vehicle further comprises a body connected to said chassis and defining an interior space of the vehicle arranged to accommodate a driver. In one embodiment, said interior space is fully enclosed. In one embodiment, an openable door is formed in said body.

In one embodiment, the front wheel support assemblies and chassis are arranged to enable the chassis to tilt up to an angle of substantially 30 degrees in either direction with respect to a vertical, upright position of the chassis.

In one embodiment, the front wheel support assembly comprises a pump arrangement to pump hydraulic fluid between hydraulic cylinders.

In one embodiment, the rear wheel support assembly comprises a pump arrangement to pump hydraulic fluid between rear hydraulic cylinders. In one embodiment, the front and rear wheel assemblies share a common pump arrangement there between. In one embodiment, the pump arrangement is electrically operated. In one embodiment, the pump arrangement comprises a bidirectional pump.

In one embodiment, the vehicle further comprises: a suspension hub assembly connected to each front wheel, pivotably connected to the front wheel support assembly and arranged to pivot with respect thereto, wherein the suspension hub assembly comprises: a first hub member pivotably connected to the front wheel support assembly; a second hub member operable to receive the surface-engaging front wheel rotatable about an axis, said second hub member being slidably connected to said first hub member and being linearly movable with respect to said first hub member along a suspension axis substantially perpendicular to the axis of rotation of said surface-engaging wheel; and a damper arrangement arranged to damp linear movement of said second hub member with respect to said first hub member along said suspension axis.

In one embodiment, said suspension axis is arranged at an angle in the range of −10 to 25 degrees from the vertical direction of the vehicle when said chassis is in an upright position. In one embodiment, said suspension axis is arranged at an angle in the range of −10 to 25 degrees from the vertical direction relative to a longitudinal axis of the vehicle.

In one embodiment, said suspension axis is longitudinally offset from said axis of rotation of said surface-engaging wheel. In one embodiment, said suspension axis is located forwardly of said axis of rotation of said surface-engaging wheel.

In one embodiment, said suspension axis is located between 20 to 50 mm forwardly of said axis of rotation. In one embodiment, the second hub member is rotatable with respect to said first hub member about a steering axis substantially perpendicular to said axis of rotation of said surface-engaging wheel to effect steering of said surface-engaging wheel.

In one embodiment, said suspension hub assembly comprises a sliding pillar suspension arrangement such that said second hub member is slidably connected to said first hub member about a pillar forming part of the first hub member. In one embodiment, said damper arrangement is located on said pillar. In one embodiment, said second hub member is rotatable about the longitudinal axis of said pillar such that said steering axis is coincident with said suspension axis.

In one embodiment, said suspension hub assembly comprises a ball spline suspension arrangement, said second hub member being linearly movable along a grooved pillar attached to said first hub member. In one embodiment, each front wheel is arranged to tilt with said chassis in use. In one embodiment, the or each rear wheel is arranged to tilt with said chassis in use.

According to a second aspect of the present disclosure, there is provided a wheel support arrangement for a vehicle comprising a chassis arranged to tilt with respect to the road surface, the wheel support arrangement comprising: at least one wheel support member pivotably connected to the chassis at a first end; a suspension hub assembly pivotably connected to the wheel support member at a second end of said wheel support member and arranged to pivot with respect thereto, wherein the suspension hub assembly comprises: a first hub member pivotably connected to the wheel support member, a second hub member operable to receive a surface-engaging wheel rotatable about an axis, said second hub member being slidably connected to said first hub member and being linearly movable with respect to said first hub member along a suspension axis substantially perpendicular to the axis of rotation of said surface-engaging wheel; and a damper arrangement arranged to damp linear movement of said second hub member with respect to said first hub member along said suspension axis.

By providing such an arrangement, the suspension arrangement is located on the wheel hub and provides for substantially vertical damping movement in a direction substantially perpendicular to the axis of rotation of the vehicle's wheels, irrespective of the angle of tilt of the wheels relative to the ground surface. By providing this arrangement, suspension translation is always in a direction perpendicular to the axis of rotation and parallel to the direction of travel of the wheel. This reduces or even eliminates tyre scrub (i.e. lateral movement of the tyre when the suspension is translating) and mitigates bump steer effects.

In one embodiment, said suspension axis is arranged at an angle in the range of −10 to 25 degrees either side of the vertical direction when said chassis is in an upright position. In one embodiment, said suspension axis is arranged at an angle in the range of −10 to 25 degrees from the vertical direction relative to a longitudinal axis of the vehicle. In one embodiment, said suspension axis is longitudinally offset from said axis of rotation of said surface-engaging wheel. In one embodiment, said suspension axis is located forwardly of said axis of rotation of said surface-engaging wheel.

In one embodiment, said suspension axis is located between 20 to 50 mm forwardly of said axis of rotation. In one embodiment, the second hub member is rotatable with respect to said first hub member about a steering axis substantially perpendicular to said axis of rotation of said surface-engaging wheel to effect steering of said surface-engaging wheel. In one embodiment, said suspension hub assembly comprises a sliding pillar suspension arrangement such that said second hub member is slidably connected to said first hub member about a pillar forming part of the first hub member.

In one embodiment, said damper arrangement is located on said pillar. In one embodiment, said second hub member is rotatable about the longitudinal axis of said pillar such that said steering axis is coincident with said suspension axis. In one embodiment, said suspension hub assembly comprises a ball spline suspension arrangement, said second hub member being linearly movable along a grooved pillar attached to said first hub member.

According to a third aspect of the present disclosure, there is provided a vehicle comprising a chassis, at least one surface-engaging front wheel, two surface-engaging rear wheels, and a propulsion unit for driving either the front wheel or wheels or the rear wheels, each rear wheel being connected to the chassis by a rear wheel support assembly comprising: a rear wheel support for allowing movement of the respective rear wheel relative to the chassis; and a rear hydraulic cylinder, the rear hydraulic cylinder comprising: a housing connected to one of the chassis and the rear wheel support; and a piston connected to the other of the rear wheel support and the chassis, the piston being moveable within the housing and arranged to divide the hydraulic cylinder into first and second chambers each having respective ports arranged to allow hydraulic fluid to enter and exit the respective chamber, the ports of the first chambers of each rear hydraulic cylinder being in fluid communication and the ports of the second chambers of each rear hydraulic cylinder being in fluid communication such that movement of hydraulic fluid from the first or second chamber of one rear hydraulic cylinder to the respective first or second chamber of the other rear hydraulic cylinder displaces the pistons of the rear hydraulic cylinders in opposing directions relative to the respective housings, wherein each rear hydraulic cylinder further comprises a hydro-pneumatic damper.

In one embodiment, each hydro-pneumatic damper comprises a chamber and a flexible membrane, the flexible membrane dividing the chamber into a hydraulic portion and a hydro-pneumatic portion. In one embodiment, the hydraulic portion is in fluid communication with the interior of the respective hydraulic cylinder.

In one embodiment, the hydro-pneumatic portion comprises a gas. In one embodiment, the gas comprises Nitrogen gas. In one embodiment, at least one hydraulic cylinder further comprises resilient means arranged to bias the vehicle towards the upright position. In one embodiment, the resilient means comprises a coil spring. In one embodiment, the coil spring is located on the hydraulic or hydro-pneumatic cylinder.

BRIEF DESCRIPTION OF THE DRAWINGS

Embodiments of the present disclosure will now be described in detail with reference to the accompanying drawings, in which:

FIG. 6 is a schematic cross-sectional view of the hydraulic cylinders of the example of FIG. 4;

FIG. 6a is a schematic cross-sectional view of a configuration of hydro-pneumatic cylinder suitable for use with the example of FIG. 4;

FIG. 17 is a side view of an example of a four-wheeled vehicle;

FIG. 18 is a plan view of the four-wheeled vehicle of FIG. 17;

FIG. 19 is a front view of the four-wheeled vehicle of FIG. 17;

DETAILED DESCRIPTION

Figure 3:
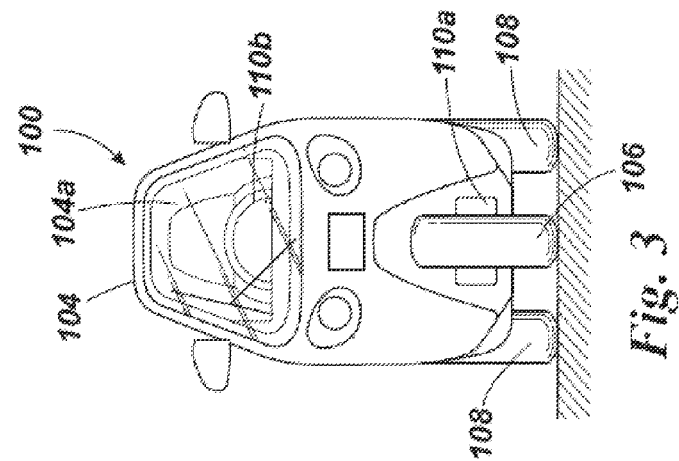
FIG. 3 is a front view of the three-wheeled vehicle of FIG. 1.
Figure 1:
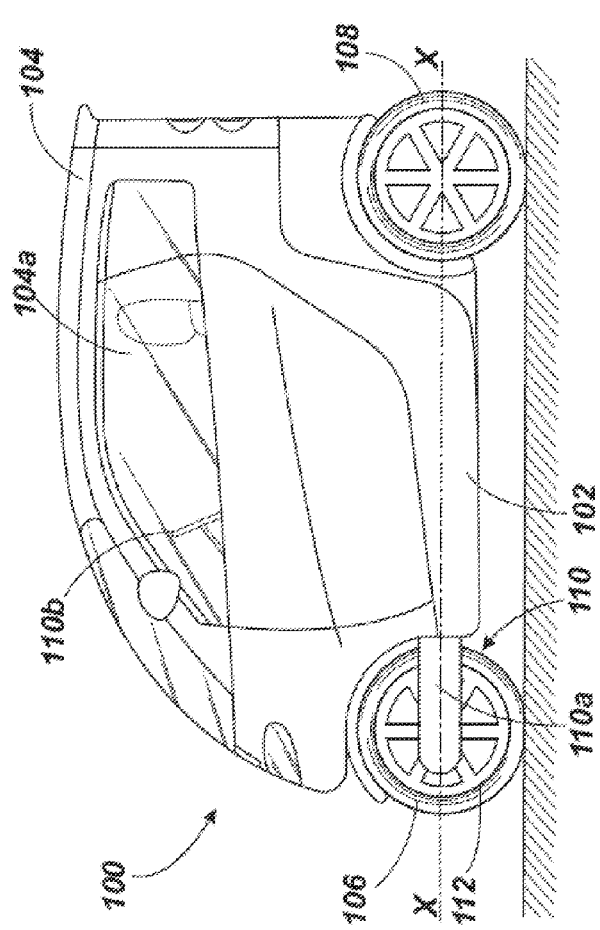
FIG. 1 is a side view of an example of a three-wheeled vehicle.
Figure 2:
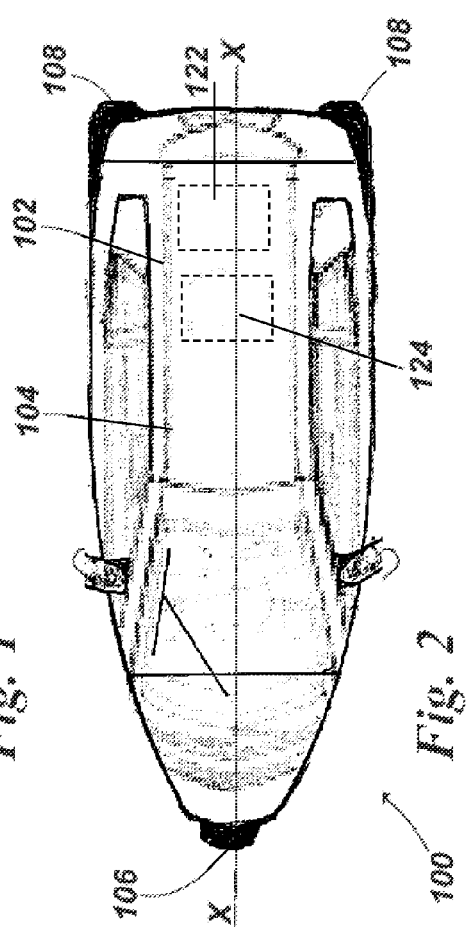
FIG. 2 is a plan view of the three-wheeled vehicle of FIG. 1.

FIGS. 1 to 3 illustrate an example of a narrow, three-wheeled vehicle 100 suitable for transportation in urban environments. The vehicle 100 comprises a chassis 102, a body 104, a surface-engaging front wheel 106 and a pair of surface-engaging rear wheels 108. The vehicle 100 is suitable for carrying up to two passengers in tandem.

The vehicle 100 can have a driver and a passenger seat in tandem with the driver and passenger sitting in-line above the longitudinal axis X-X of the vehicle 100. The body 104 of the vehicle 100 may be entirely enclosed. In other words, the body 104 defines an interior space 104a for the driver (and, optionally, a passenger) which is substantially enclosed such that it can substantially protect the occupants from the external environment. To allow ingress to and egress from the vehicle 100, the body 104 may be provided with, for example, two or four conventional side-opening car-type doors (two doors are shown in FIGS. 1 to 3). Optionally, the vehicle 100 may also comprise a vertically-opening tailgate. Alternatively, the vehicle 100 may be a single-seater with a single or pair of doors or hatches.

The vehicle 100 typically might have an overall width of 750 to 900 mm, an overall length of 2000 to 2500 mm and a height of 1400 to 1600 mm. The tyres would typically have an overall diameter of approximately 350 to 450 mm and be 100 to 150 mm wide. However, the overall vehicle length could be as much as 2600 mm and the tyre diameter could be up to 550 mm.

The chassis 102 is rigid and may comprise, for example, a tubular space-frame or monocoque construction. The skilled person will be readily aware of variations that could be made to the frame and which still fall within the scope of the present disclosure. The chassis 102 may be formed from any suitable material. However, lighter weight materials are preferred; for example, aluminium or carbon fibre.

The chassis 102 comprises a steering arrangement 110 to enable the vehicle 100 to be steered. The steering arrangement 110 comprises a front swing arm 110a. The steering arrangement 110, and potential alternatives, will be described later.

The front wheel 106 is mounted for rotation at the front end of the chassis 102. A front tyre 112 carried by the front wheel 106 preferably has a round profile because, as will be discussed further below, the front wheel 106 will lean with the chassis 102 when the vehicle 100 is turning. However, this need not be the case and other tyre and wheel constructions may be utilised.

The steering arrangement 110 comprises a control device 110b which may take the form of a handlebar or steering wheel which is manipulable by the driver to cause the front wheel 106 to pivot in order to steer the vehicle. It will be appreciated that alternative steering and suspension mechanisms for the front wheel 106 can be used and which will be described later.

Figure 4:
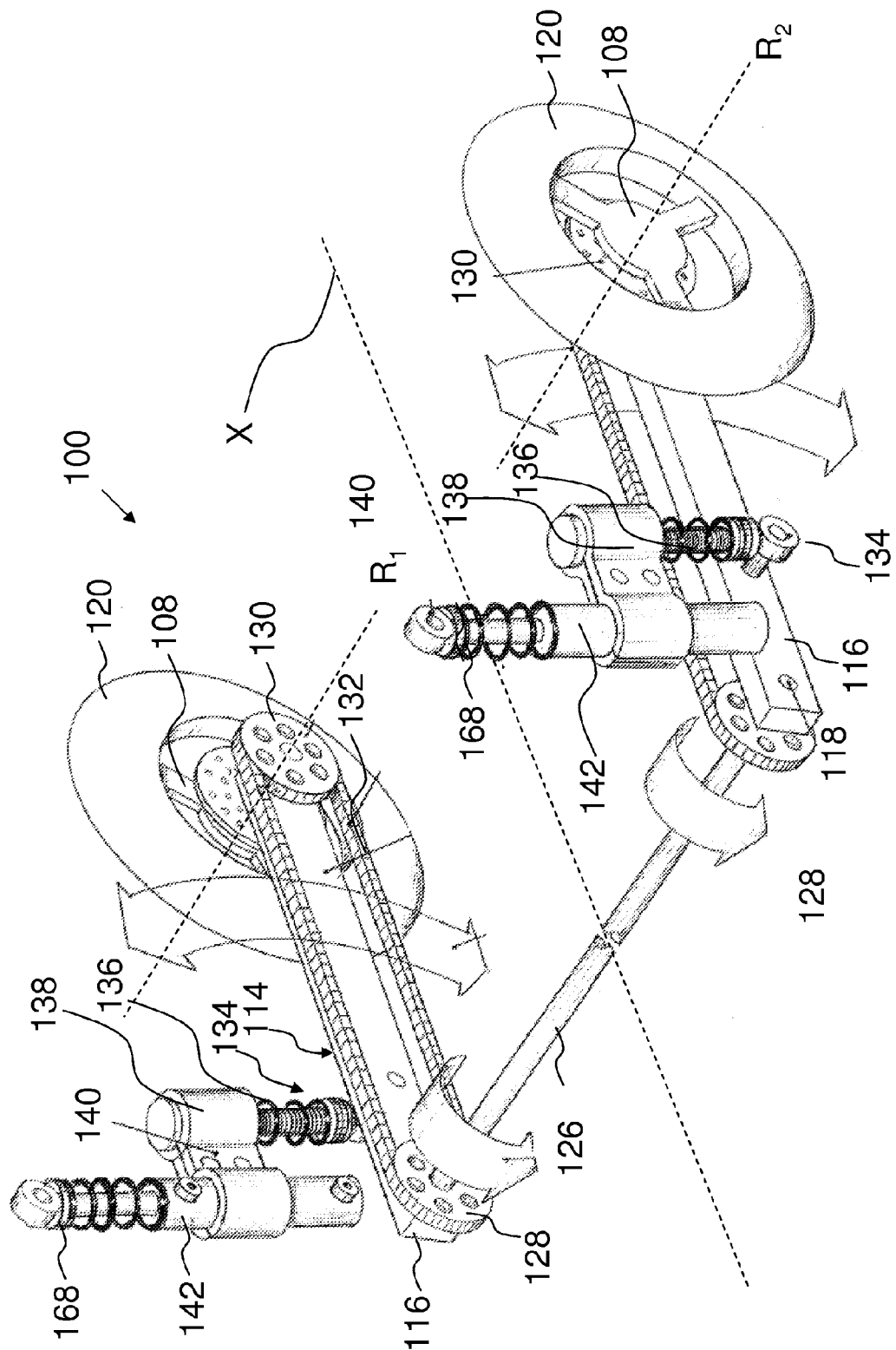
FIG. 4 is a detailed perspective view showing the rear wheels, drive train and suspension of the vehicle of FIG. 1.
Figure 5:
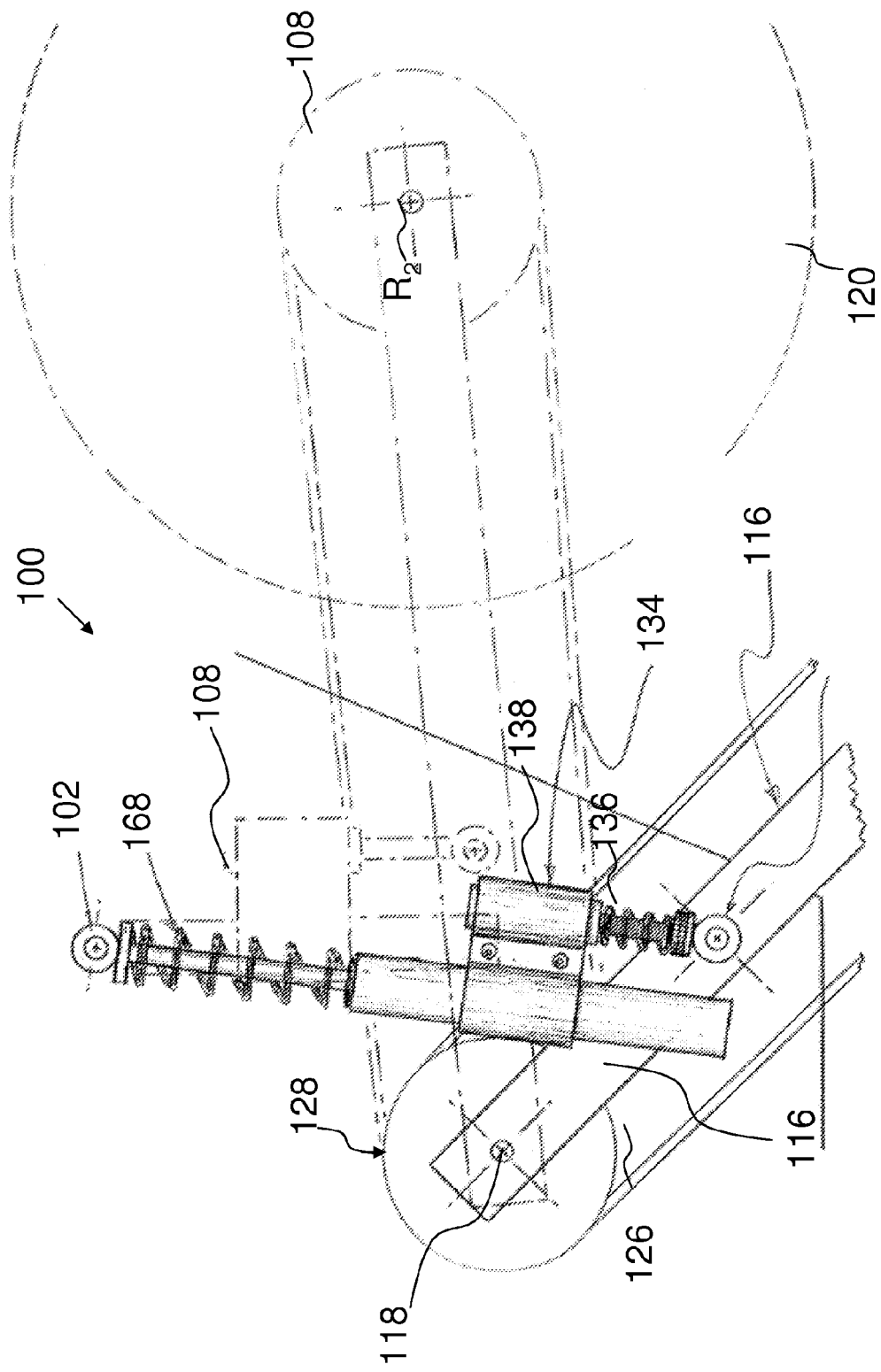
FIG. 5 is a side elevation of a portion of the rear of the vehicle of FIG. 1 showing the rear suspension unit in extended and retracted states.

Two rear wheel support assemblies 114 are shown in FIGS. 4 and 5. The rear wheel support assemblies 114 are located on either side of the rear of the chassis 102. Each rear wheel support assembly 114 comprises a swing arm 116 which is mounted on the side of the rear of the chassis 102. Each swing arm 116 is fixed at one end to a pivot bearing 118 in the chassis 102 so that each arm 116 is cantilevered from the chassis 102 and, furthermore, each arm 116 trails the chassis 102 and lies in a plane parallel to the longitudinal axis X-X of the vehicle 100. Each arm 116 is therefore a trailing swinging arm at the free end of which is rotatably mounted one of the rear wheels 108. A tyre 120 is carried by each of the rear wheels 108 and preferably has a round profile because each of the rear wheels 108 leans into a turn with the chassis 102, as will be discussed further below. Each of the trailing swinging arms 116 can pivot about its bearing 118 so that each rear wheel 108 can move up and down in an arc about the respective bearing 118 as shown by the block arrows in FIG. 4.

A propulsion unit 122 (shown schematically in dotted lines in FIG. 2) is located between the rear wheels 108 and, as such, enables the vehicle 100 to have a low centre of gravity. This assists the vehicle 100 by creating stability during cornering because one of the heaviest components of the vehicle 100 is located partly or entirely between (or at least close to) the axes R1, R2 of the rear wheels 108.

Further, the location of the propulsion unit 122 between the rear wheel support assemblies 114 and between the rear wheels 108 results in space-efficient packaging of the internal components of the vehicle 100. The propulsion unit 122 may be, for example, located beneath a passenger seat of the vehicle 100. The location of the propulsion unit 122 in this manner is possible because the tilting mechanism, unlike known arrangements, does not require any structural members or components to be located between the rear wheels 108 as will be described later.

The propulsion unit 122 may take any suitable form; for example, as an internal combustion engine such as a petrol engine or diesel engine, an electric motor, or a so-called "hybrid engine" (being a combination of an internal combustion engine and an electric motor), is mounted in the chassis 102.

The propulsion unit 122 drives the rear wheels 108. In the case of the propulsion unit 122 being an internal combustion engine, the propulsion unit 122 may also include a gearbox (not shown) which may be integral with the propulsion unit 122 (or engine) or may be located separately from the propulsion unit 122. However, it is desirable that the gearbox is located low down in the chassis 102 of the vehicle 102 in order to provide a low centre of gravity for the vehicle 100. It is also desirable for the gearbox to be located between the rear wheels 108 to provide a compact drive train arrangement.

The propulsion unit 122 also comprises a power source 124 (shown schematically in dotted lines in FIG. 2). The type of power source 124 utilised depends upon the type of propulsion unit 122 used in the vehicle 100. In the case of an internal combustion engine, the power source 124 will take the form of a fuel tank and will desirably be located at the rear of the vehicle 100, such that at least a part of the fuel tank is located between the rear wheel support assemblies 114 or between the rear wheels 108.

If an electric motor or hybrid drive is used as a propulsion unit 122, then the power source 124 may comprise an array of batteries, for example lithium ion batteries. The batteries could be charged in any suitable fashion; for example, by an external power source such as the mains, or by on-board power sources such as a fuel cell or a "range-extender" type small internal combustion engine. Alternatively, a fuel cell may be utilised without a battery source if this is required.

If such on-board power sources are used, then it is preferred that they are located towards the rear of the chassis 102, desirably such that a least a part of the power source 124 is located between the rear wheel support assemblies 114 or between the rear wheels 108

The drive from the propulsion unit 122 to the rear wheels 108 may be by any suitable means. For example, as shown in FIG. 4, an output from the propulsion unit 122 is connected to drive a horizontal transverse drive shaft 126 to each end of which is fixed front drive sprockets 128. The front drive sprockets 128 drive respective rear sprockets 130 mounted on each rear wheel 108 via a respective drive chain or belt 132. It will be noted that the axis of rotation of the horizontal drive shaft 126 is co-linear with the axes of the bearings 118 of the swing arms 116.

As an alternative to the chain or belt drive shown in FIG. 4, each of the rear wheels 108 may be driven by a respective drive shaft running parallel to the swinging arm 116 (or a motor may be the swingarm itself), each drive shaft being driven by the horizontal drive shaft 126.

Each rear wheel support assembly 114 comprises a shock absorber 134 which is provided to control the vertical arcuate movement of each respective swinging arm 116. In the example shown, each shock absorber 134 has a coiled compression spring 136 to absorb the shock of the rear wheel 108 hitting a bump and a hydraulic damper 138 which damps compression and extension of the coil spring 136 in known manner. A gas-filled damper may alternatively be used. In a further alternative, piezoelectric dampers may be used. These dampers can utilise piezo-electric elements to lock the dampers when stationary. The piezo-electric material can also be constantly adjusted to change ride dynamics when the vehicle 100 is on the move.

An end of the hydraulic damper 138 of each shock absorber 134 is connected to its respective swinging arm 116. The other end 140 of each shock absorber 134 is rigidly connected to a housing 142 of a respective hydraulic cylinder 144 which also forms part of each rear wheel support assembly 114. As shown in FIG. 4, the other end of the hydraulic cylinder 144 is connected to the vehicle chassis 102.

As shown in the simplified illustration shown in FIG. 6, each hydraulic cylinder 144 has a central piston rod 146 which can moveable along an axis Y-Y relative to the housing 142. The lower end of the piston rod 146 has a piston head 148 which sealingly engages the internal wall of the housing 142 by means of an O-ring 150. The piston head 148 and O-ring 150 divides the hydraulic cylinder 144 into a first, upper chamber 152 and a second, lower chamber 154. The volumes of the upper and lower chambers 152, 154 vary as the piston rod 146 moves up and down. The volumes of the upper and lower chambers 152, 154 vary inversely proportionally, i.e. the upper chamber 152 decreases by an amount equal to the amount by which the lower chamber 154 increases when the piston head 148 moves upwardly (relative to the arrangement shown in FIG. 6). Hydraulic fluid 156 fills the whole of the upper and lower chambers 152, 154 of the hydraulic cylinder 144. The hydraulic fluid 156 may be a magnetorheological (MR) fluid such as Filisko.

The end 158 of each piston rod 146 opposite the piston head 148 is connected to the vehicle chassis 102. Thus, each swinging arm 116 is connected to the chassis 102 by means of the series connection of the hydraulic cylinder 144 and shock absorber 134 as well as by the bearing 118 about which the swinging arm 116 pivots.

Each hydraulic cylinder 144 has an upper port 160 through the housing 142 to the upper chamber 152 and a lower port 162 through the housing 142 to the lower chamber 154. As shown in FIG. 1 and indicated schematically in FIG. 5, the upper port 160 of one hydraulic cylinder 144 is connected to the upper port 160 of the other hydraulic cylinder 144 by a flexible hose 164. Similarly, the lower port 162 of each hydraulic cylinder 144 is connected to the lower port 162 of the other hydraulic cylinder 144 by a flexible hose 166. Therefore, a closed loop hydraulic circuit is formed by the flexible hoses 164, 166 and the hydraulic cylinders 144.

The arrangement of the closed hydraulic loop using flexible hoses 164, 166 enables convenient packaging arrangements to be used in the vehicle 100. For example, the space in the vehicle 100 between the rear wheels 108 and hydraulic cylinders 144 can be utilised for the propulsion unit 122 of the vehicle (see FIG. 2) because the flexible hoses 164, 166 can be threaded around such parts of the vehicle 100.

Therefore, in operation, as a piston rod 146 moves down in one hydraulic cylinder 144, the fluid 156 in the lower chamber 154 of that cylinder 27 is pumped via the lower hose 166 to the lower chamber 154 of the other hydraulic cylinder 144. This forces the piston rod 146 of the other hydraulic cylinder 144 to move upwards, thereby pumping hydraulic fluid 156 from the upper chamber 152 of the other hydraulic cylinder 144 through the upper flexible hose 164 to the upper chamber 152 of the first hydraulic cylinder 144. In other words, when the piston head 148 of one hydraulic cylinder 144 moves in a first direction (either upwardly or downwardly), then the piston head 148 of the other hydraulic cylinder 144 moves in an opposing direction. This assists the vehicle 100 in tilting as will be described.

Each hydraulic cylinder 144 also has a coil spring 168 attached between the end 158 of the respective piston rod 148 and the housing 142. The coil spring 168 is arranged to provide a restoring force on each hydraulic cylinder 144. Thereby, in the absence of other forces, the coil springs 168 return the piston heads 148 within the hydraulic cylinders 144 to the same displacement position, naturally returning the vehicle 100 to the upright position. This also acts as a failsafe in the event of failure.

In order to cause the vehicle 100 to lean into a turn (i.e. to roll about the longitudinal axis X-X of the vehicle 100), hydraulic fluid 156 is moved from either the upper chamber 152 or lower chamber 154 of a first hydraulic cylinder 144 to the corresponding upper or lower chamber 152, 154 of the second hydraulic chamber 144 via either flexible hose 164, 164. Since the hydraulic system is a closed loop and the hydraulic fluid 156 is substantially incompressible, then fluid will move back through the other of the flexible hoses 164, 166 back to the first hydraulic cylinder 144. This movement of hydraulic fluid 156, therefore, causes the piston heads 148 to move differentially in opposing directions and causing the vehicle to tilt with respect to the ground surface.

The movement of the hydraulic fluid 156 can be accomplished in different ways. The preferred method depends upon the vehicle dynamic conditions, such as the vehicle speed, tilt angle, acceleration, cornering force or other suitable parameters. In some situations, the tilting of the vehicle 100 must be handled automatically (for example, at high speed where human error may cause an accident) without direct user input to tilt the vehicle. In other situations, user input (for example, shifting of the user's body weight by leaning) is the preferred method to manoeuvre or steer the vehicle (for example, when at low speed or when reversing/parking). Consequently, the embodiment of the present disclosure is arranged to provide different modes of operation for tilting the vehicle.

In a first mode of operation, the driver is able to tilt the vehicle manually by manipulating his/her body weight. In order to tilt the vehicle, the driver of the vehicle 100 leans into the turn so as to shift his or her body weight laterally away from the longitudinal axis X-X of the vehicle 100 in the direction of the desired turn. For example, if the vehicle 100 is to enter into a left hand turn, the driver leans to the left. This transfer of body weight over the left side of the vehicle 100 causes the piston rod 146 of the left hand hydraulic cylinder 144 to depress, forcing hydraulic fluid 156 out of the lower chamber 154 of that hydraulic cylinder 144 through the lower hose 166 and into the lower chamber 154 of the right hand hydraulic cylinder 144.

This in turn causes the piston rod 146 of the right hand cylinder 144 to move upwards with a consequent transfer of hydraulic fluid 156 from the upper chamber 152 of the right hand cylinder 144 to the upper chamber 152 of the left hand cylinder 144. Because of the compression of the overall length of the left hand hydraulic cylinder 144, the left hand swinging arm 116 moves upwards relative to the chassis 102, thereby tipping the left side of the chassis 102 downwards.

Similarly, the extension of the right hand hydraulic cylinder 144 forces the right hand side of the chassis 102 upwards with the right hand swinging arm 116 pivoting relatively downwards about its bearing 118. Thus, the vehicle 100 leans by the appropriate amount, which is adjustable by the amount of lean of the driver, assisting the shift of body weight of the driver and also distributing the vehicle weight more evenly between the two rear wheels 108. In addition, as will be understood by those skilled in the art, the vehicle 100 can also be caused to lean by applying appropriate forces parallel to the longitudinal axis X-X to the control device such as a handlebar. Thus, the vehicle 100 can be caused to lean in a controllable manner entirely passively without the use of any active control system (such as computer or other electronic control) and without the heavy and complex semi-active lever linkages of some known arrangements, some of which require operation of foot pedals by the driver in order to cause the vehicle to lean.

The movement of the piston rod 146 in the housing 142 of the hydraulic cylinder 144 and the movement of the swing arm 116 is illustrated further in FIG. 6. The fully extended configuration of the hydraulic cylinder 144 is shown in the left-hand hydraulic cylinder 144 in FIG. 6 and the fully compressed configuration of the hydraulic cylinder 144 is shown by the right-hand hydraulic cylinder 144 in FIG. 6.

Figure 6B:
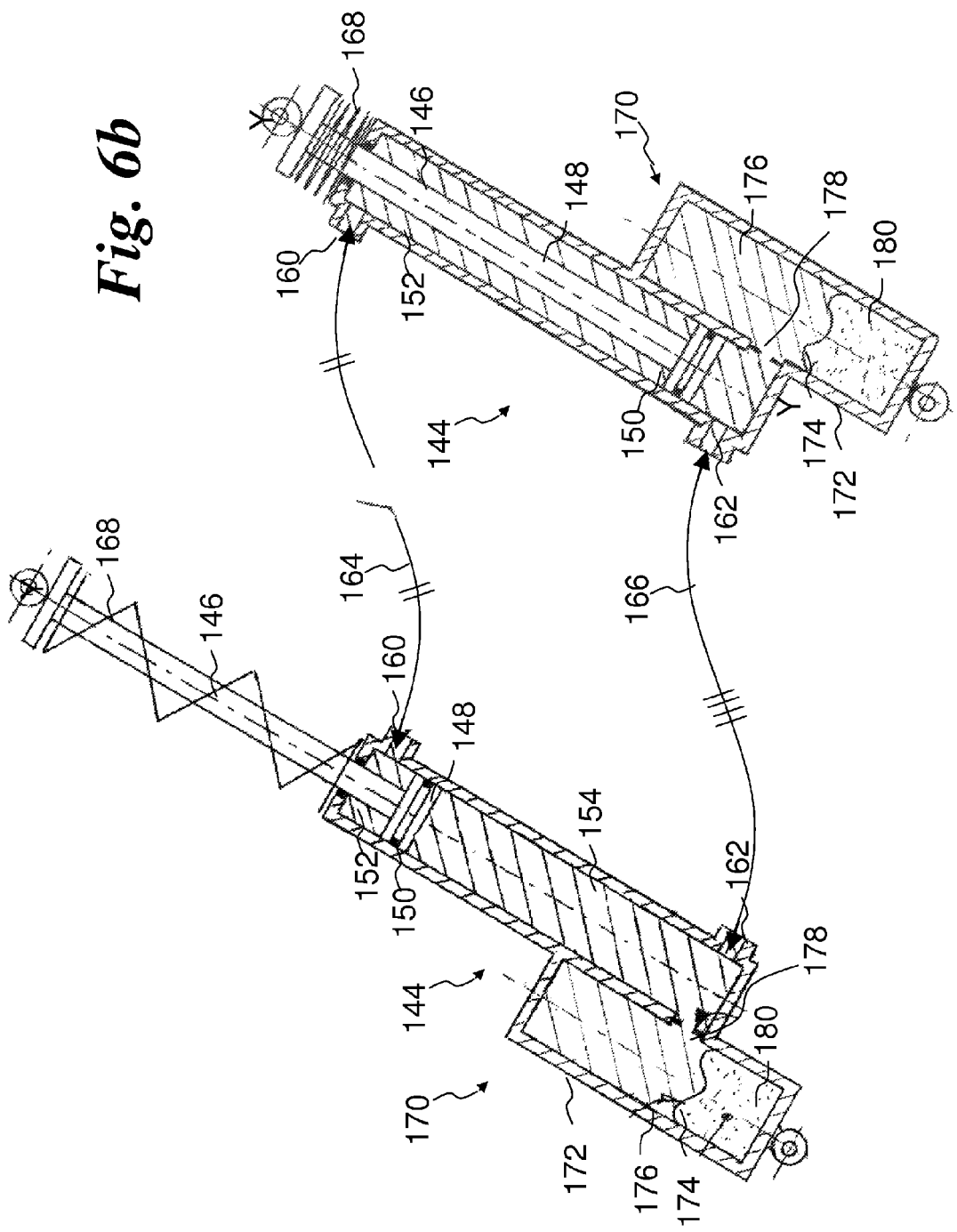
FIG. 6b is a schematic cross-sectional view of an alternative configuration of hydro-pneumatic cylinder suitable for use with the example of FIG. 4.

Alternative configurations of hydro-pneumatic cylinder 144 are shown in FIGS. 6a and 6b. In the variations of FIGS. 6a and 6b, the shock absorber 134 on each hydraulic cylinder is replaced by a hydro-pneumatic shock absorber/damper arrangement. Features in FIGS. 6a and 6b in common with FIG. 6 have retained the same reference numerals for clarity.

FIG. 6a shows a first arrangement of hydro-pneumatic shock absorber 170 forming part of the housing of each hydraulic cylinder 144. The shock absorber 170 comprises a substantially spherical housing 172 within which a flexible membrane 174 is located. The membrane 174 divides the housing 172 into two sections. A first section 176 is in communication with the interior of the lower chamber 154 of the cylinder 144 and is filled with hydraulic fluid. An orifice 178 is formed to demark the lower end of the lower chamber 154 and the first section 176 and to act as a seat for the lower extremity of the piston rod 148.

The second section 180 is filled with Nitrogen or similar gas. The Nitrogen gas is compressible and so acts as a damper or shock absorber. Consequently, in use, when the piston rod 148 is displaced downwardly (relative to FIG. 6a), the incompressible hydraulic fluid is displaced downwardly and a force will be exerted on the membrane 174, compressing the Nitrogen gas therein. This compression of the gas provides beneficial damping of high frequency oscillations such as those generated over rough surfaces.

FIG. 6b shows a second arrangement of hydro-pneumatic shock absorber 170 forming part of the housing of each hydraulic cylinder 144. In this embodiment, the shock absorber 170 comprises a substantially cylindrical housing 172 which is offset from the axis Y-Y of the piston rod 148. Therefore, this arrangement is more vertically compact than the previous arrangement and is more suitable for applications where height restrictions may be an issue.

Otherwise, the components of the second arrangement correspond to those of the previous arrangement. A flexible membrane 174 is located within the cylindrical housing 172. The membrane 174 divides the housing 172 into two sections. A first section 176 is in communication with the interior of the lower chamber 154 of the cylinder 144 and is filled with hydraulic fluid. In contrast to the previous embodiment, the orifice 178 is formed in a side wall of the lower chamber 154 and is located alongside the travel path of the piston rod 148.

As for the previous embodiment, the second section 180 is filled with Nitrogen gas. The Nitrogen gas is compressible and so acts as a damper or shock absorber. Consequently, in use, when the piston rod 148 is displaced downwardly (relative to FIG. 6b), the incompressible hydraulic fluid is displaced downwardly and a force will be exerted on the membrane 174, compressing the Nitrogen gas therein. This compression of the gas provides beneficial damping of high frequency oscillations such as those generated over rough surfaces.

Figure 7:
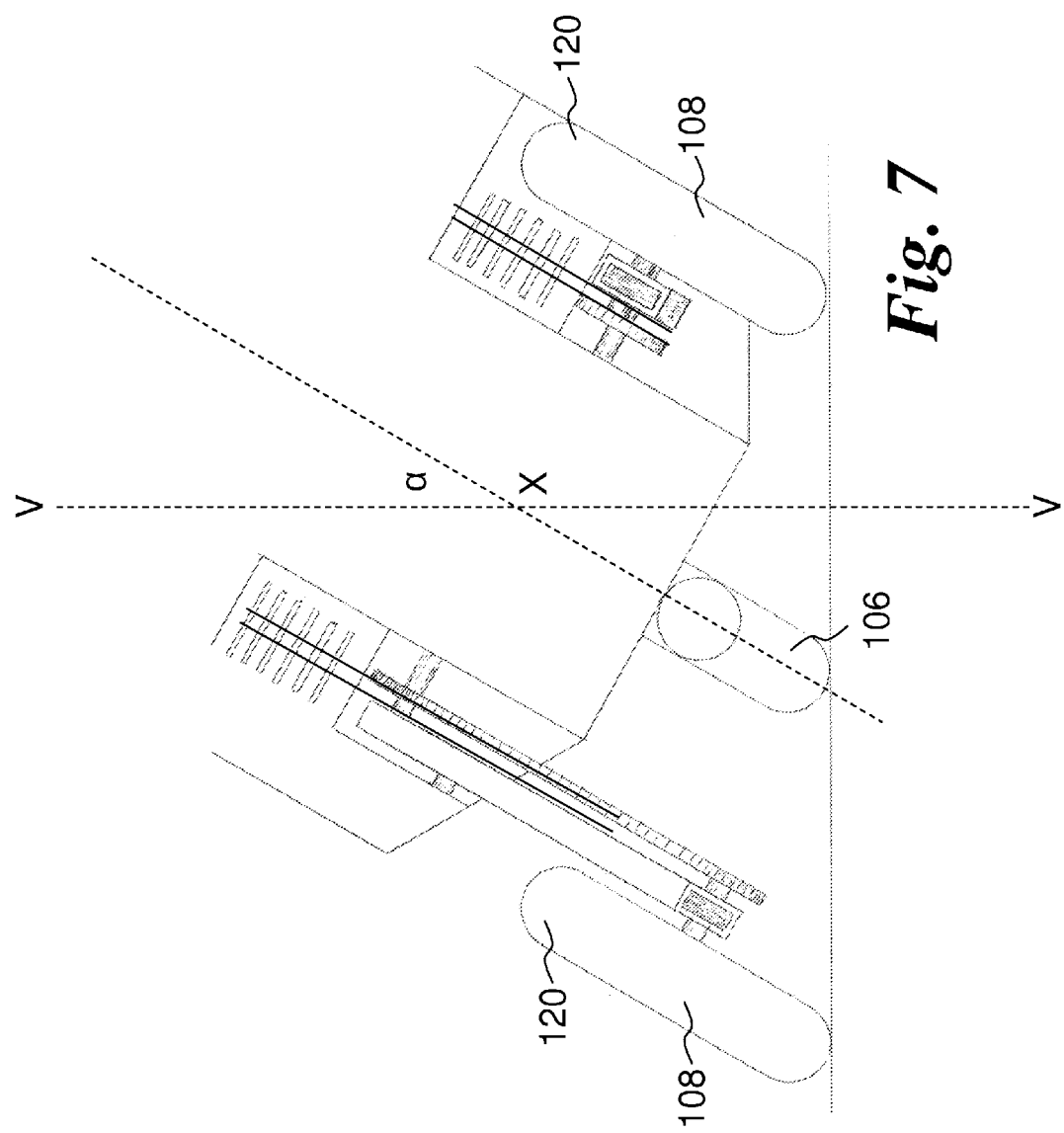
FIG. 7 is a rear view of the vehicle of FIG. 1 tilting in a turn.

FIG. 7 shows the vehicle 100 from the rear when leant over to the right for a right hand turn. The right hand hydraulic cylinder 144 is fully compressed so that the right hand side of the vehicle 100 tips downwards towards the ground. The left hand hydraulic cylinder 144 is fully extended, pushing the left hand side of the vehicle 100 upwards.

It can also be seen from this figure that the arrangement of the propulsion unit 122 and power source 124 low down in the chassis 102 assists in maintaining the centre of gravity of the vehicle 100 between the rear wheels 108. This is maintained irrespective of the angle of tilt of the chassis 102 of the vehicle 100, aiding stability of the vehicle 100 and preventing the vehicle 100 from toppling over in a turn. The stability of the vehicle 100 is further assisted by the location of at least a part of each of the propulsion unit 122 and power source 124 lies between the wheel assemblies 114 in both lateral and longitudinal directions which aids stability. The centre of gravity should also be low down in the vehicle 100, preferably no more than 450 mm above the ground surface.

It can also be seen from FIG. 7 that, in a turn, all of the wheels 106, 108 of the vehicle 100 tilt in unison with the chassis 102 at substantially the same angle. This is the reason for the curved profile on the tyres of the vehicle and maintains a compact tilting arrangement.

The chassis 102 of the vehicle 100 is arranged to articulate or tilt. The angle of tilt $\alpha$ is measured relative to the upright, vertical position (shown by axis V-V in FIG. 7) and the vehicle 100 can tilt up to and including an angle of 30 to 40 degrees away from the vertical, upright position V-V. In other words, the centre line of the vehicle (i.e. a plane running vertically through the centre of the chassis 102 and parallel to the axis X-X) can be tilted by up to 30 to 40 degrees away from the upright position V-V. All of the vehicle wheels tilt parallel to the centre line of the chassis 102. This enables the vehicle 100 to turn sharply, whilst maintaining stability and engagement of the rear wheels 108 with the surface. Due to the inherent stability of the vehicle 100 afforded by the low centre of gravity, the angle $\alpha$ is much greater than that of known arrangements. However, other maximum angles of tilt $\alpha$ may be used as appropriate. For example, even though the vehicle 100 may be capable of higher angles of tilt, the vehicle 100 may be limited to a predefined, lower angle for safety purposes.

Figure 8:
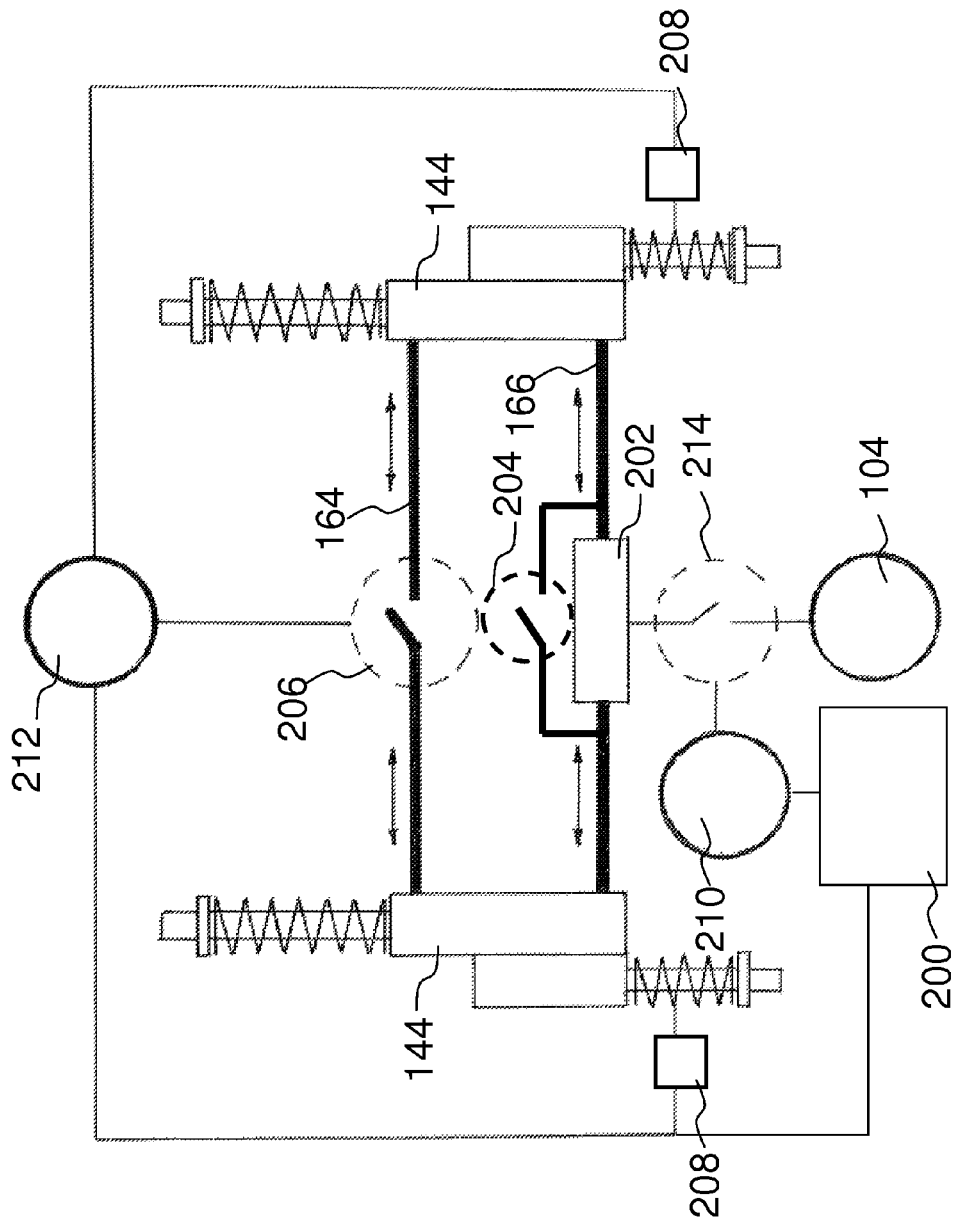
FIG. 8 is a schematic diagram of a control arrangement for controlling the hydraulic cylinders of FIG. 6.

The hydraulic arrangement of the present disclosure also has a second mode of operation. In the second mode of operation, the tilting of the vehicle 100 is accomplished automatically and not by movement of the driver's body weight. FIG. 8 illustrates a schematic diagram of a control arrangement 200 to achieve this.

The control arrangement 200 comprises, for example, a microprocessor and is operable to control the hydraulic cylinders 144 and shock absorbers 134 to control the leaning of the vehicle. The control arrangement 200 controls a pump arrangement 202, a bypass valve 204, a valve 206 and damper controllers 208 associated with each shock absorber 134. In order to provide vehicle dynamics information to the control arrangement 200, first and second accelerometers 210, 212 are provided. The accelerometers 210, 212 may be located in any suitable place on the vehicle 100 and may communicate with the control arrangement through any suitable communication means, for example, wires or through wireless communication using, for example, a short range wireless network.

The accelerometer 210 is preferably located on the steering arrangement 110 in order to provide the current position of the control device (such as a steering wheel or handlebars as shown in FIG. 2) to the control arrangement 200. In this arrangement, wireless communication between the control arrangement 200 and the accelerometer 210 is beneficial to remove the need for wires between these components, reducing weight and mechanical wear.

The control arrangement 200 also controls a steering arrangement lock out 214. In addition, the control arrangement 200 also has access to information such as vehicle speed (through, for example, a speedometer) and yaw rate information (which may be used to determine vehicle slip angle, for example).

In the second mode of operation, the movement of hydraulic fluid 156 within the closed hydraulic loop and between each of the hydraulic cylinders 144 is controlled by the pump arrangement 202. The pump arrangement 202 is located in communication with the flexible hose 166. However, other arrangements may be used. Any suitable type of pump may be used. However, a bidirectional pump; for example, a helical screw pump is preferred. Alternatively, the pump arrangement 202 may comprise more than one pump. The pump arrangement 202 is controlled by the control arrangement 200.

Located in parallel with the pump arrangement 202 is a bypass valve 204. The bypass valve 204 may take any suitable form of valve which is at least bistable in nature, i.e it can be opened or closed. A variable-opening valve may also be used. An example of suitable valve may be a solenoid valve. The bypass valve 204 is controlled by the control arrangement 200. The bypass valve 204 is able to open in order to enable the vehicle to be operated in the first mode of operation, i.e. the vehicle can be tilted by movement of the driver's body laterally away from the longitudinal axis X-X.

In the first mode of operation, the pump arrangement 202 is bypassed and hydraulic fluid 156 is able to flow through the bypass valve 204. The control arrangement 200 selects the first mode of operation automatically when it is determined that the speed of the vehicle 100 is below a pre-determined value, for example below 25 km/h, preferably below 15 km/h, more preferably below 5 km/h or when the vehicle is reversing. In this mode of operation, the steering arrangement lock out 214 is not engaged, and so the driver can steer the front wheel of the vehicle 100 using the control device 106. Also, at these speeds, the driver is able to steer the vehicle 100 safely by leaning to, for example, weave in and out of traffic or perform a reversing manoeuvre.

Alternatively, the first mode of operation may be selectable by the driver and the second mode of operation will be the default mode of operation unless the first mode is explicitly selected by the driver by, for example, a button on the control device 106.

However, in the second mode of operation, the control arrangement 200 closes the bypass valve 204 and so the movement of hydraulic fluid 156 is governed by operation of the pump arrangement 202. This is done at higher speeds above approximately 15 km/h. In the second mode of operation, the steering arrangement lock out 214 is also activated so the steering arrangement 110 no longer directly steers the front wheel of the vehicle 100. Instead, the front wheel of the vehicle is free to castor and, when the driver turns the control device 106, the accelerometer 210 detects the movement of the control device 106 and communicates a control signal to the control arrangement 200. In response to the signal from the accelerometer 210, the control arrangement 200 operates the pump arrangement 202 to pump hydraulic fluid 156 in the appropriate direction to lean the vehicle 100 in the direction in which the driver intends to move (as indicated by the direction in which the driver moves the control device 106).

The control arrangement also controls the valve 206. The valve 206 is located along the flow path of the other flexible hose 164 (although other arrangements may be used) and is configured to function as a lock to break the closed loop hydraulic fluid circuit. This is used to provide stability to the vehicle 100 when stationary. With the valve 206 open, hydraulic fluid 156 can flow between the hydraulic cylinders 144, allowing the vehicle 100 to be leant over as required. With the valve 206 closed, hydraulic fluid 156 cannot flow between the hydraulic cylinders 144, meaning that the angle of lean of the vehicle 100 is fixed.

This means that the vehicle 100 can be parked in a stable upright position. The vehicle 100 can even be parked upright on a cambered road by setting the amount of lean appropriately to take account of the lean before operating the valve 206. The valve 206 can be operated when the vehicle is moving at relatively high speed in order to prevent the vehicle from tipping at speed if desired. The control arrangement 200 may be configured to close the valve 206 when the vehicle parking brake (not shown) is applied. A switch (not shown), which may conveniently be mounted on or near the control device 106, can be operated to open or close the valve 206 as required.

The control arrangement 200 is also operable to control the damping of the shock absorbers 134 through the damper controllers 208. The damper controllers 208 provide the ability to modify the damping characteristics of the shock absorbers 134. The rate and/or level of damping could be adjustable depending on the surface on which the vehicle 100 is being driven, or alternatively the shock absorbers 134 could "lock" and become extremely stiff to provide stability when the vehicle 100 is stationary and, for example, the driver and/or passenger is entering or exiting the vehicle 100. The damper controllers 208 may use a variety of suitable techniques to achieve adjustable damping; for example, piezoelectric or pneumatic dampers. Through the use of a magnetorheological (MR) fluid such as Filisko, the hydraulic systems can also be controlled. Alternatively, the hydraulic fluid may comprise water.

Variations on the above control arrangement are possible. For example, alternative accelerometer arrangements could be used. In possible arrangements, a number of accelerometers could be used: a) To measure, in both first and second modes, when the vehicle has stopped b) to measure, in both first and second modes, the vehicle acceleration (in both forward and reverse directions); b) to sense up/down movements on the rear wheels such that the dampers could be automatically adjusted and/or c) to indicate or sound an alarm when the chassis 102 is close to, or reaches, the maximum 30 to 40 degree tilt.

Figure 9:
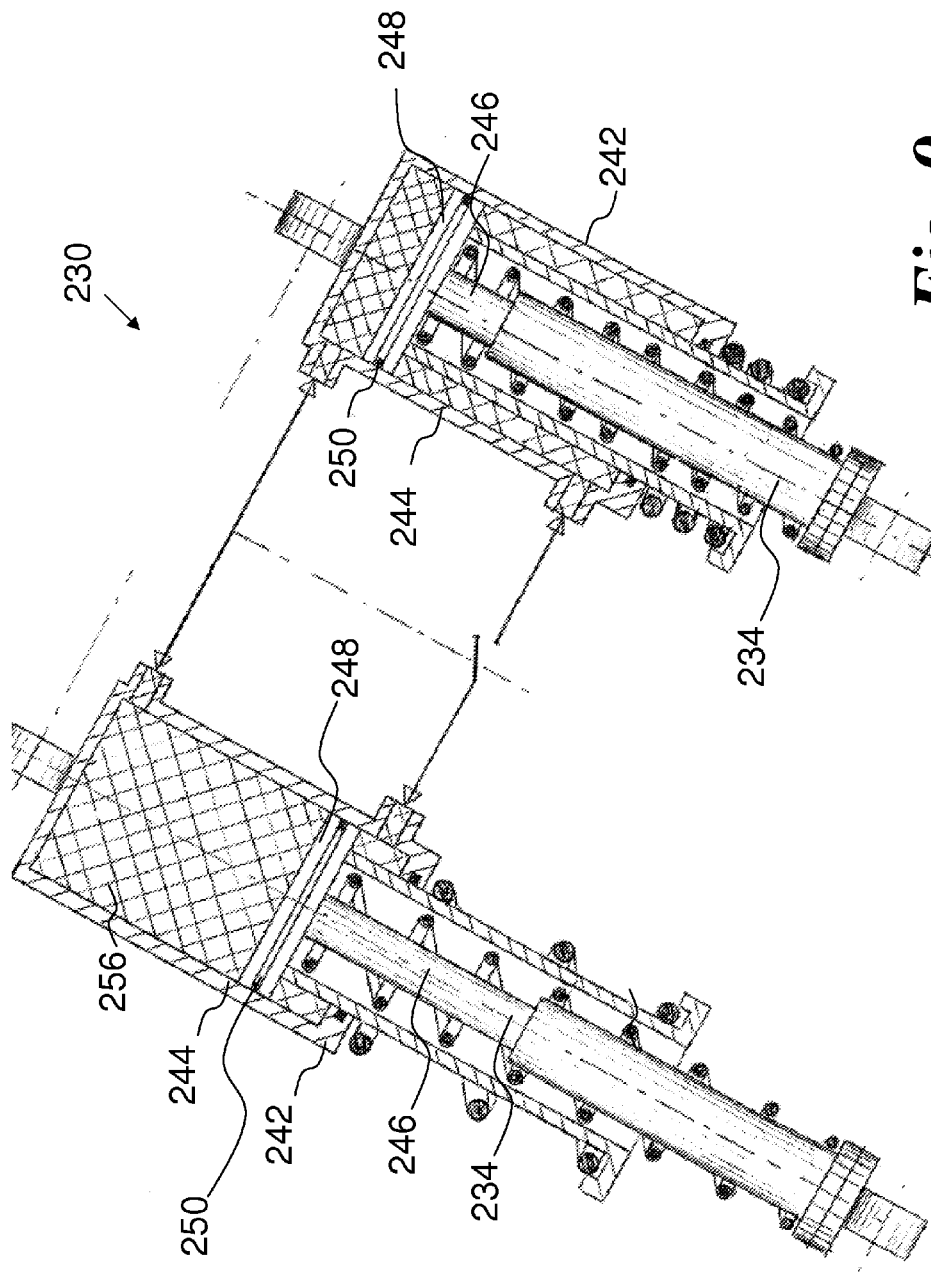
FIG. 9 is a schematic cross-sectional view showing the operation of another example of rear suspension units.

An alternative construction 230 for the hydraulic cylinders and shock absorbers is shown in FIG. 9. In this example, the shock absorber 234 is integral with the hydraulic cylinder 244 and mounted internally of the housing 242 of the hydraulic cylinder 244 and, furthermore, provides the piston rod 246 of the hydraulic cylinder 244. As such, the shock absorber 234 carries a piston head 248 at its end within the housing 242. The piston head 248 sealingly engages with the internal wall of the housing 242 by means of an O-ring 250. In this example, the housing 242 of the hydraulic cylinder 244 is connected to the chassis 102 and the piston rod 246 formed by the shock absorber 234 is connected to the swing arm 116. Thus, in a left hand turn for example, when the driver leans over to the left, hydraulic fluid 256 is pumped out of the upper chamber 252 of the left hand hydraulic cylinder 244 to the upper chamber 252 of the right hand hydraulic cylinder 244 and from the lower chamber 254 of the right hand hydraulic cylinder 244 to the lower chamber 254 of the left hand hydraulic cylinder 244. In other respects, the operation of the integral hydraulic cylinders 244 and shock absorbers 234 of FIG. 9 is similar to that of the hydraulic cylinders 144 shown in FIG. 6 and described above.

An expansion tank (not shown) can be provided for the hydraulic fluid 256 with access to the expansion tank being provided to enable the hydraulic fluid 256 to be topped up as necessary.

Figure 10:
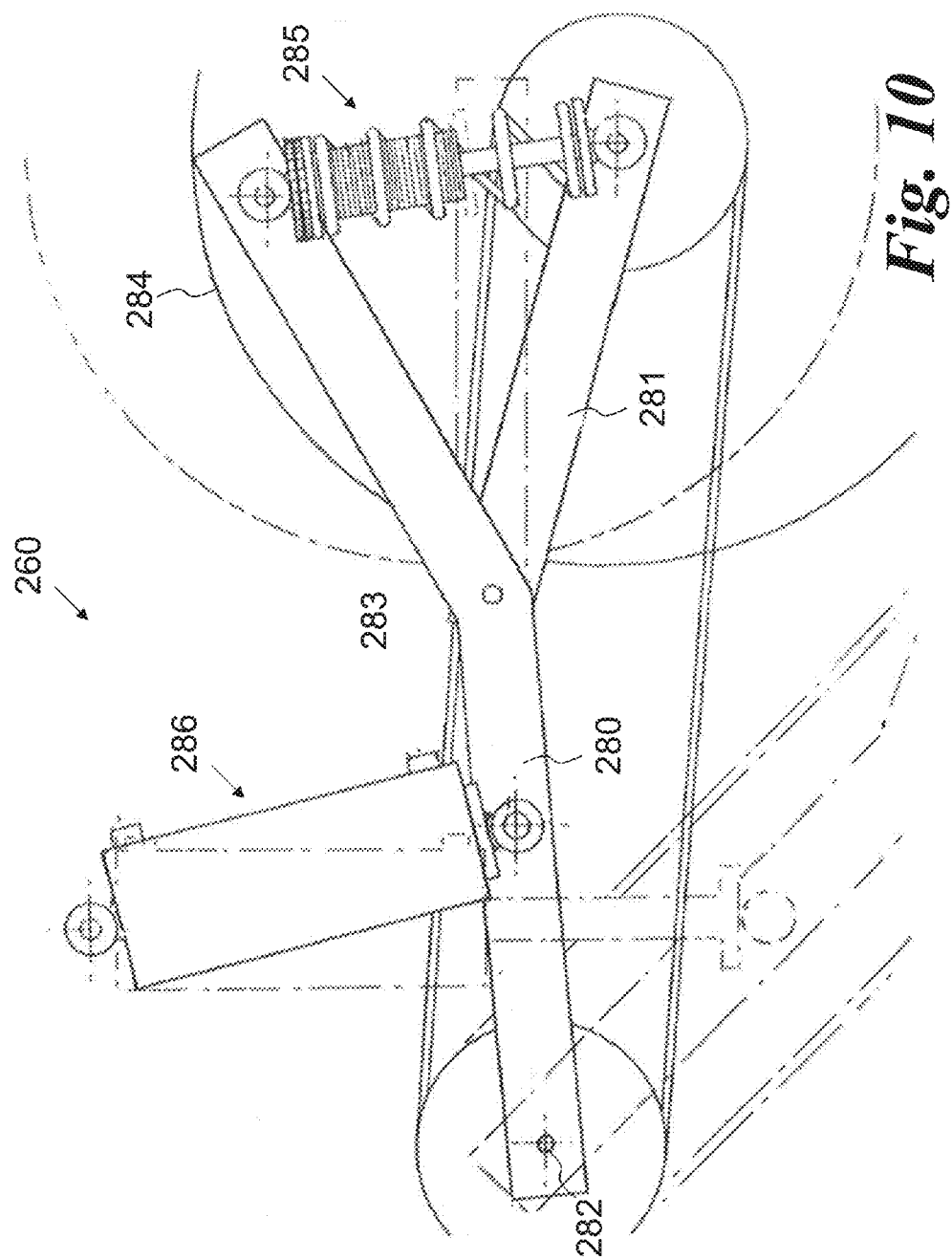
FIG. 10 is a schematic side elevation of another example of the rear wheel suspension.
Figure 11:
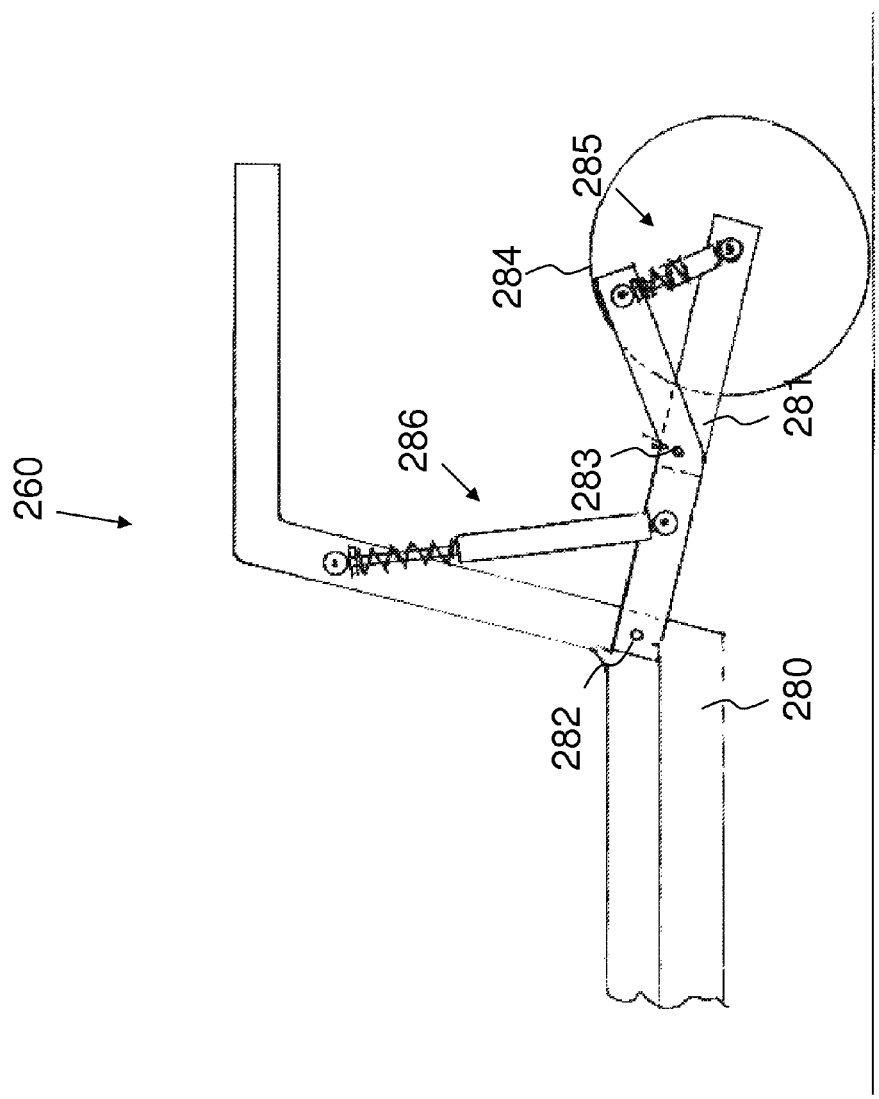
FIG. 11 is a further schematic side elevation of the example of the rear wheel suspension shown in FIG. 10.

An alternative arrangement 260 for the rear suspension is shown in FIGS. 10 and 11. In this example, each swinging arm 116 for the rear wheels 108 is in two parts, a primary swing arm 280 and a secondary swing arm 281. The primary swing arm 280 is fixed at one end to the pivot bearing 282 in the chassis 102. The primary swing arm 280 is kinked upwards part way along its length by an angle of approximately 25°. A first end of the secondary swing arm 281 is pivotally connected to the primary swing arm 280 by a bearing 283 at the kink in the primary swing arm 280. The secondary swing arm 281 carries a rear wheel 284 at its other end. The shock absorber 285 is connected between the secondary swing arm 281 and the upwardly kinked portion (i.e. the rearmost portion) of the primary swing arm 280. Shock absorption of bumps is achieved by movement of the secondary swing arm 281 relative to the primary swing arm 280 and consequent damped compression of the shock absorber 285. The hydraulic cylinder 286 is connected between the chassis 102 and the primary swing arm 280. Leaning of the vehicle 100 is achieved as described above. The driver moves his or her bodyweight over the side of the vehicle that is to move downwards with consequential pumping of hydraulic fluid between the hydraulic cylinders 286 and movement of the primary swing arm 280 relative to the chassis 102. Alternatively, a pump, such as the pump arrangement 202 shown in FIG. 8, may be used.

The shock absorbers 134; 285 may be damped using piezoelectric means. The shock absorbers 134; 285 in this case can be locked in position by passing an electrical charge through piezoelectric material, further to increase stability when the vehicle 100 is stationary for example.

The hydraulic fluid in the hydraulic cylinders 144; 286 may be "Filisko" or similar Magnetorheological fluid, the viscosity of which can be adjusted by application of different electrical voltages. Alternatively, the hydraulic fluid may be water.

Figure 12:
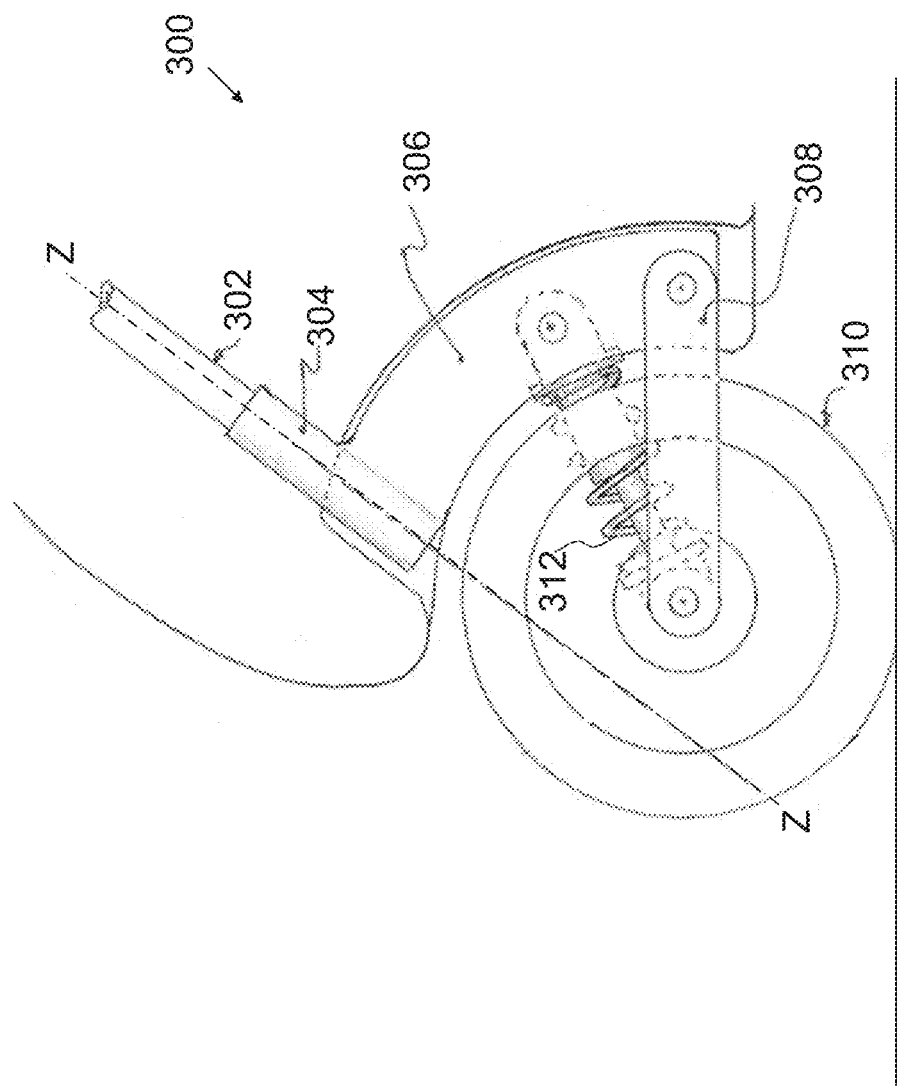
FIG. 12 is a schematic side view of a front wheel assembly suitable for use with the vehicle of FIG. 1.
Figure 13:
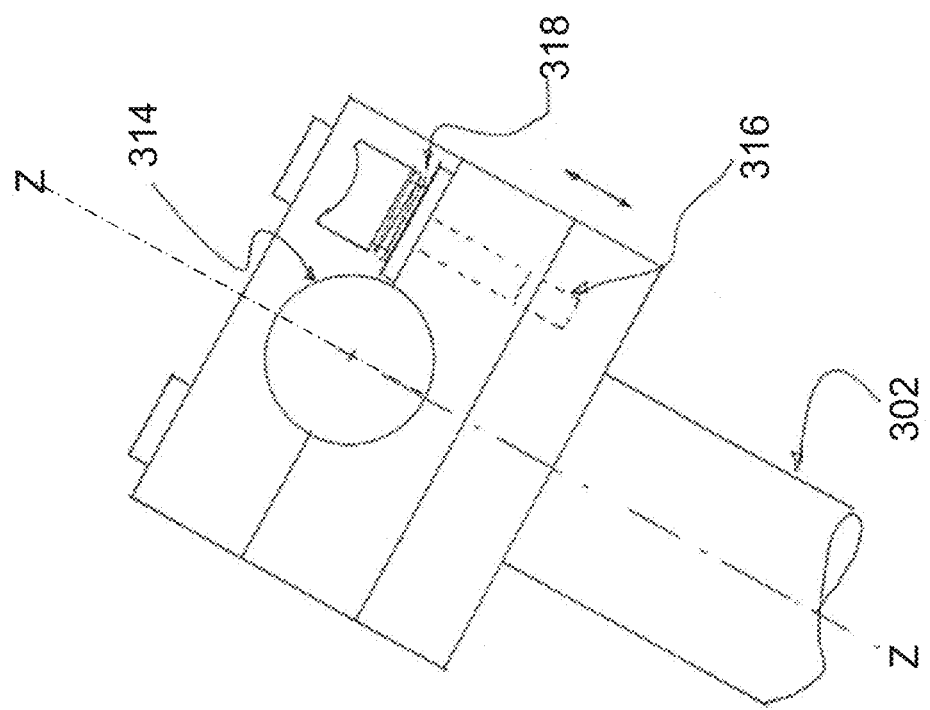
FIG. 13 is a schematic view of part of the assembly of FIG. 12.

FIGS. 12 and 13 show a possible arrangement of the front wheel of the vehicle 100 which is suitable for use with the control arrangement 200 of FIG. 8. FIG. 12 shows a steering arrangement 300 which comprises a steering column 302, a kingpin 304 and a steering yoke 306. A front swing arm 308 is connected to the steering yoke 306 and the front swing arm is, in turn, connected to a front wheel 310 which is rotatably secured at an end thereof. A shock absorber 312 is connected between the front swing arm 308 and the steering yoke 306, i.e. in practice the shock absorber (or damper) 312 is connected between the front swing arm 308 and the chassis 102. The shock absorber 312 may optionally be controlled by a damper controller similar to that described above. As can be seen in FIG. 9, the centreline of the kingpin Z-Z passes forwardly of the centre of the front wheel 310 and may, optionally, be raked. This enables the front wheel 310 to castor.

Referring to FIG. 13, a mechanism for disengaging the steering of the vehicle 100 to enable free to castor operation (i.e. the first mode of operation) is shown. At the upper end of the steering column 302 is located a control device 314 in the form of a handlebar. The handlebar and the steering column 302 are interconnected by means of a locking pin 316 controlled by a sprung button 318. The button 318 optionally allows engagement/disengagement of the steering column 302 and handlebars. The locking pin 316 is also operable by a solenoid controlled by the control arrangement 200 in order to enable switching between the first mode of operation (in which the front wheel 310 is directly controllable by the control device 314), and the second mode of operation (in which the front wheel 310 and front swing arm 308 is free to castor and steering is accomplished by tilting of the chassis 102). In other words, the locking pin 316 is able to selectively engage/disengage the mechanical link between the steerable, pivotable front swing arm 308 and the control device 314. The angle of trail may be approximately 15 to 25 degrees from vertical and 20-50 mm in front of the wheel centre for a free to castor arrangement.

Figure 14:
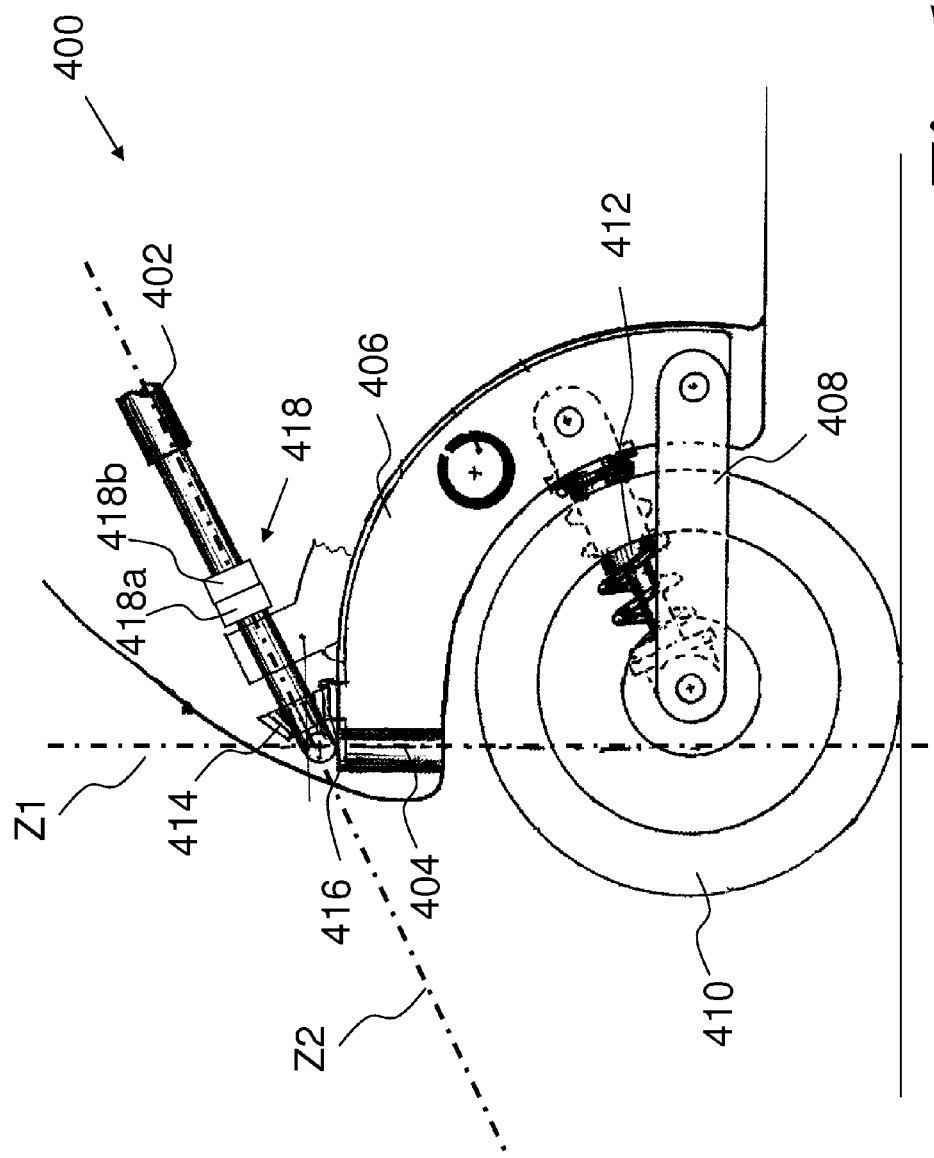
FIG. 14 is a schematic side view of an alternative front wheel assembly suitable for use with the vehicle of FIG. 1.

FIG. 14 shows an alternative arrangement of the front wheel of the vehicle 100 which is suitable for use with the control arrangement 200 of FIG. 8. FIG. 13 shows a steering arrangement 400 which comprises a steering column 402, a kingpin 404 and a steering yoke 406. A front swing arm 408 is connected to the steering yoke 406 and the front swing arm is, in turn, connected to a front wheel 410 which is rotatably secured at an end thereof. A shock absorber 412 is connected between the front swing arm 408 and the steering yoke 406. The shock absorber 412 may optionally be controlled by a damper controller similar to that described above. As can be seen in FIG. 11, the centreline of the kingpin Z1 passes forwardly of the centre of the front wheel 410. This enables the front wheel 410 to castor.

In this embodiment, steering of the vehicle is effected by means of a bevel gear 414 located at a distal end of the steering column 402 which engages with a complementary bevel gear 416 located on the yoke 406. The mechanical link between the front wheel 410 and the steering column 402 can be engaged or disengaged as required by means of a locking pin as described in relation to the previous embodiment. In the embodiment of FIG. 13, the steering linkage (comprising the bevel gears 414, 416) is located directly above the centreline of the wheel 410. However, this need not be so. The steering linkage may be located forwardly or rearwardly of the centreline of the wheel 410 as is required. Further, whilst bevel gears 414, 416 are shown in FIG. 13, alternative mechanisms such as a worm gear or rack and pinion may be used. Additionally, the steering column 402 is operable to telescope back and forth along the axis Z2, the steering column length and angle could be adjusted to suit individual drivers.

In this embodiment, an alternative mechanism for disengaging the steering of the vehicle 100 to enable free to castor operation (i.e. the first mode of operation) is shown. Towards the base of the steering column 402 is located a clutch 418. The clutch 418 comprises first and second clutch plates 418a, 418b which are selectively engageable and disengageable by a user. The clutch 418 optionally allows engagement/disengagement of the steering column 402 in order to enable switching between the first mode of operation (in which the front wheel 410 is directly controllable by the control device 414), and the second mode of operation (in which the front wheel 410 and front swing arm 408 is free to castor and steering is accomplished by tilting of the chassis 102). In other words, the clutch 418 is able to selectively engage/disengage the mechanical link between the steerable, pivotable front swing arm 408 and the control device operable by a user. This may, optionally, be used in addition to the button mechanism described previously as a failsafe.

Figure 15:
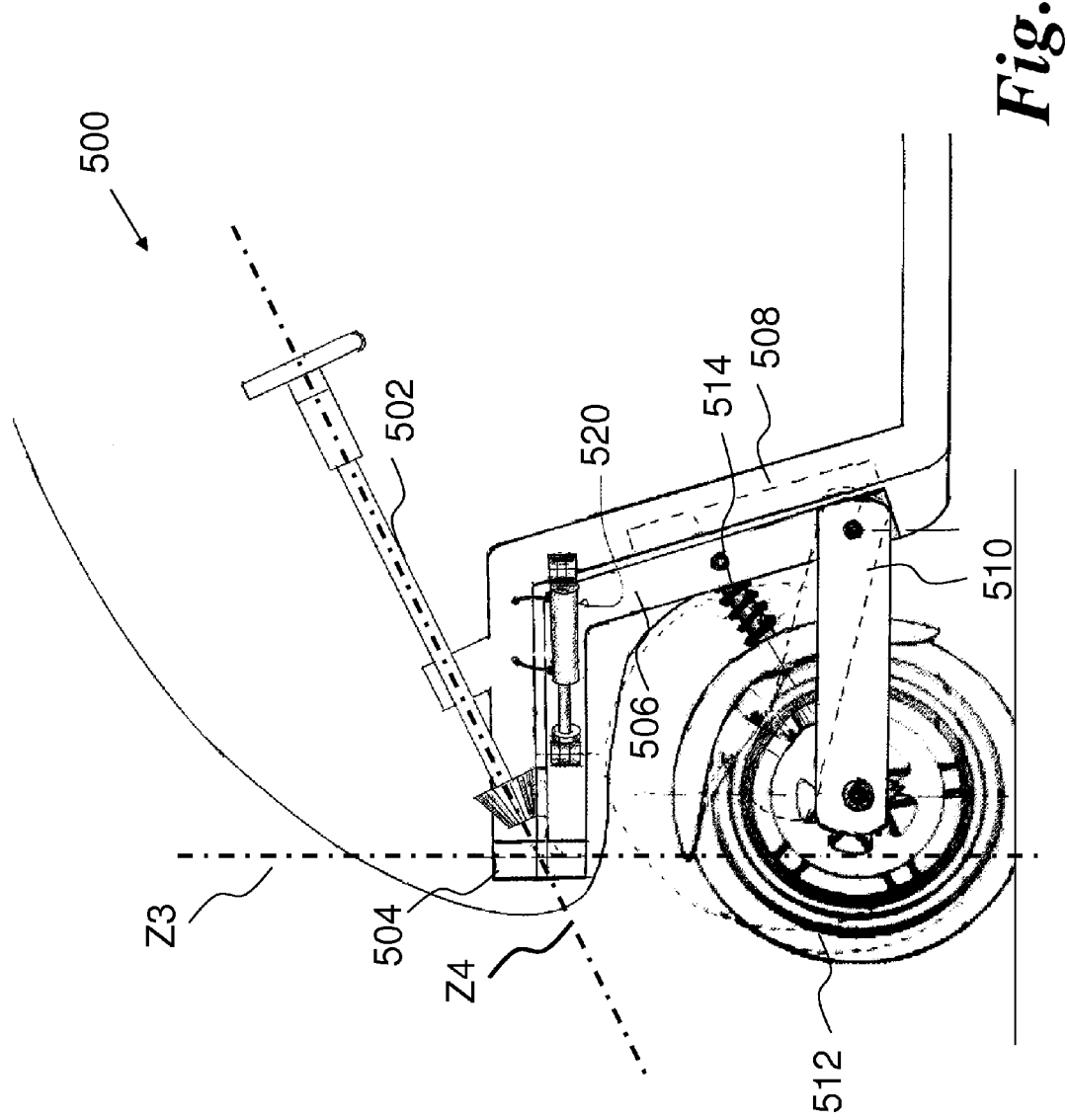
FIG. 15 is a schematic side view of a further alternative front wheel assembly suitable for use with the vehicle of FIG. 1.

FIG. 15 shows a further alternative steering arrangement 500 suitable for use with the control arrangement 200 of FIG. 8. FIG. 15 shows a steering arrangement 500 which comprises a steering column 502, a kingpin 504 and a steering yoke 506. In this embodiment, the steering yoke 506 is conformally located adjacent a front part 508 of the vehicle body. This provides for a stronger and more reliable location of the yoke 506.

A front swing arm 510 is connected to the steering yoke 506 and the front swing arm 510 is, in turn, connected to a front wheel 512 which is rotatably secured at an end thereof. A shock absorber 514 is connected between the front swing arm 510 and the steering yoke 506. The shock absorber 514 may optionally be controlled by a damper controller similar to that described above. As can be seen in FIG. 14, the centreline of the kingpin Z3 passes forwardly of the centre of the front wheel 512. This enables the front wheel 512 to castor.

Similarly to the embodiment of FIG. 13, the steering column 502 is in mechanical communication with the steering yoke 506 by means of a pair of bevel gears 516, 518. However, other alternative mechanical connections may be used; for example, a rack and pinion system or a worm gear and follower.

The proximity of the steering yoke 506 to the front part 510 of the vehicle body in this embodiment enables the addition of a pair of castor shimmy dampers 520 (only one of which is shown in FIG. 14). Each castor shimmy damper 520 is connected between the front part 510 of the vehicle body and the steering yoke 506 and is arranged to prevent shimmy of the front wheel 512 when operating in a castoring mode. In this embodiment, the castor shimmy damper 520 may be a spring. The castor shimmy damper 520 may, optionally, be omitted since, in certain configurations of vehicle 100, it may not be needed.

Additionally, the castor shimmy dampers 520 may be replaced by a pair of hydraulic cylinders such as the cylinders 144 described with reference to the rear wheel arrangement. In this configuration, the hydraulic cylinders could be used to steer the vehicle in the first (manual counter steer) mode of operation, or as a failsafe mode should the bevel gear arrangement fail.

In common with the rear wheel arrangement, such a hydraulic cylinder arrangement, with a hydraulic cylinder located either side of the steering arrangement, springs may be provided on the hydraulic cylinder (similarly to earlier embodiments) to return the front wheel 512 of the vehicle to the centre.

Figure 16:
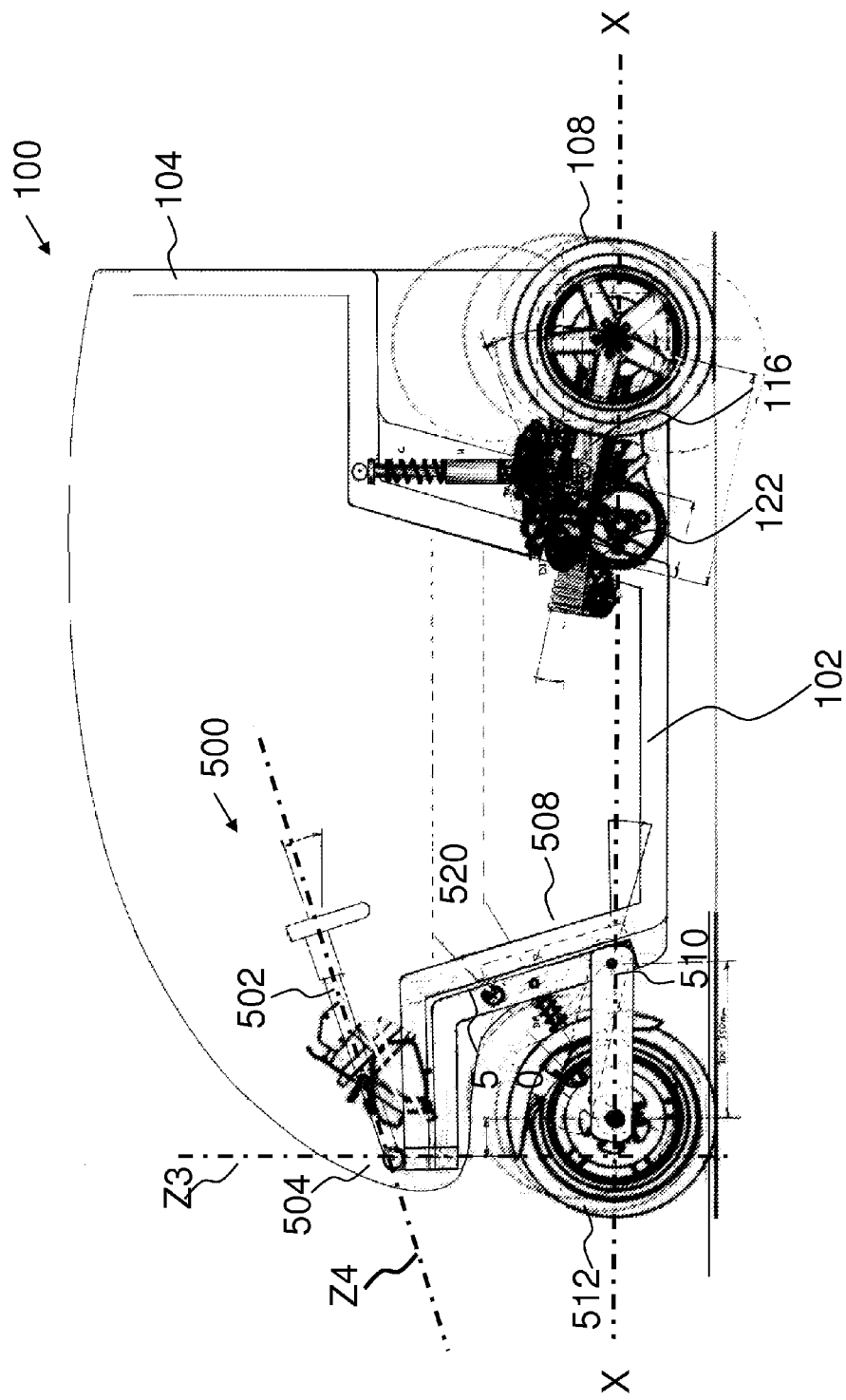
FIG. 16 is a schematic side view showing a vehicle incorporating the front wheel assembly of FIG. 13.

FIG. 16 shows the steering arrangement 500 incorporated into a vehicle 100 similar to that shown in FIGS. 1 to 3. For clarity, the features shown in FIG. 16 which are also shown in FIGS. 1 to 3 share the same reference numerals.

As shown in FIG. 16, the steering column 502 lies at an angle of between 10-15 degrees to the horizontal axis X-X. However, this may be adjustable to suit a particular driver. Additionally, the front swingarm 510 is able to pivot relative to the steering yoke 506 through an angle between 10-15 degrees relative to the horizontal axis X-X. This enables the vehicle 100 to traverse surface irregularities such as bumps or hills. The rear swing arms 116 are also able to pivot about their central axis at an angle of between 20-35 degrees either side of the horizontal axis X-X.

Additionally, as shown in FIG. 16, the propulsion unit 122 is located at least partially between the rear wheels. This arrangement enables a low, rearward centre of gravity, improving the stability of the vehicle in a turn.

The above arrangements each relate to a three wheeled vehicle wherein a single front wheel is provided. However, the present disclosure is also applicable to four wheeled vehicles. FIGS. 17 to 19 illustrate a four wheeled vehicle. For brevity, the same reference numerals are used for the four wheeled vehicle as for the three wheeled vehicle shown in FIGS. 1 to 3 and the features in common will not be described further here.

Figure 20:
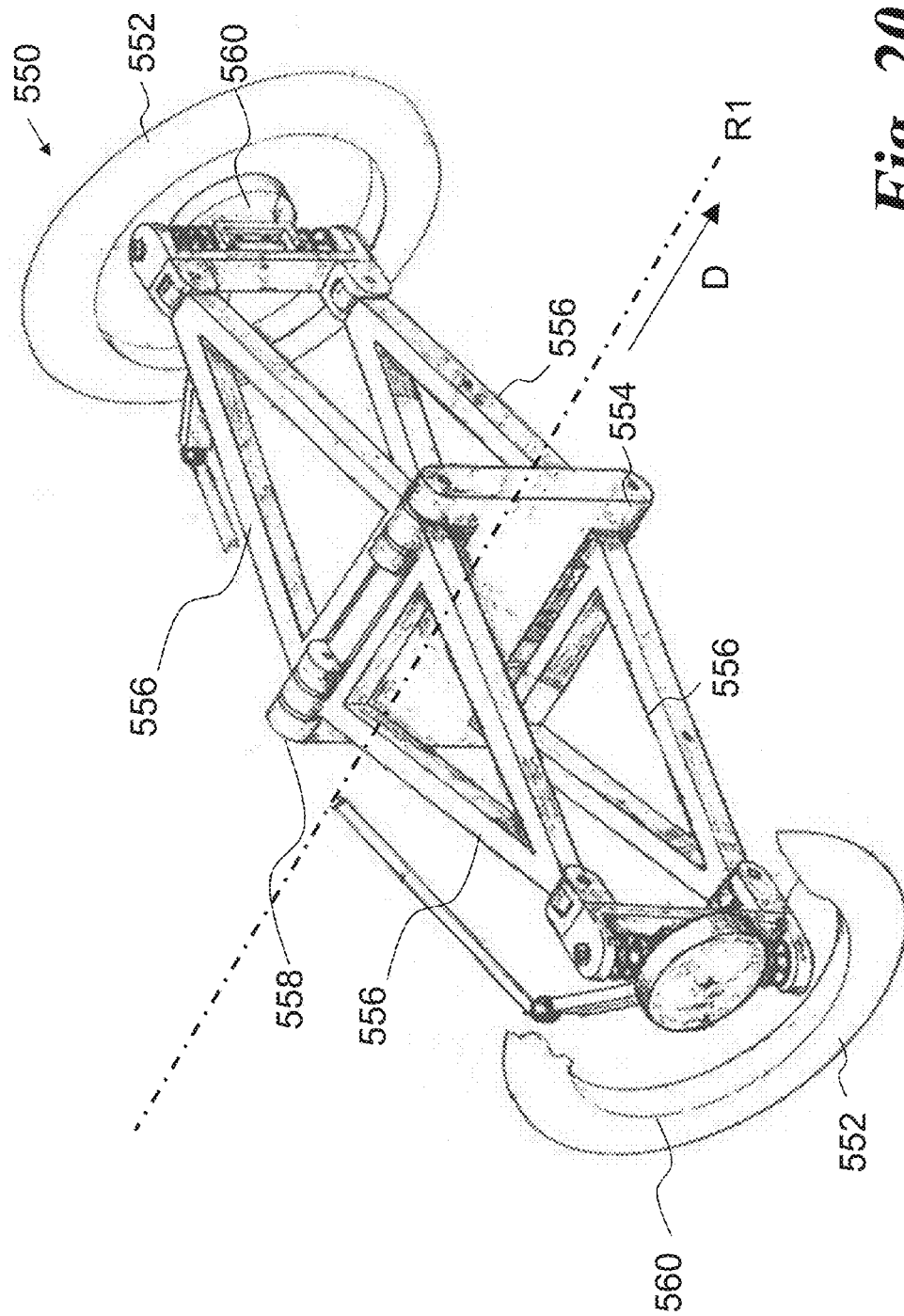
FIG. 20 is an isometric view of a first front wheel steering arrangement for use with the vehicle of FIG. 17.

FIG. 20 shows a first embodiment of a steering arrangement 550 in which two front wheels 552 are provided. The two front wheels 552 are able to steer, tilt and castor as for the previous steering arrangements 300, 400, 500 comprising only a single front wheel.

The steering arrangement 550 comprises a central member 554 which is arranged to rotate about an axis R1-R1 lying parallel to the axis X-X shown in FIGS. 1 and 17. The central member 554 is arranged to rotate with the remainder of the chassis 102 of the vehicle 100. The central member 554 may be an integral part of the chassis 102, or may be connected thereto.

Attached to the central member 554 are four A-arms or wishbones 556. Two wishbones 556 are located on opposing upper sides of the central member 554 and are connected to the central member 554 by hinges 558. A further two wishbones 556 are connected to the central member 554 at opposing lower sides of the central member 554. In other words, a pair of wishbones 556 extends away from each side of the central member 554. In this embodiment, the upper wishbones 556 on both sides of the central member 554 are integrally formed as a single unit extending between the wheels 552. Furthermore, the lower wishbones 556 are also formed as a single unit extending between the wheels 552.

The wishbones 556 connect at their distal ends to wheel hubs 560 which are connected to the wheels 552. A suspension arrangement 1000 is located adjacent the wheel hub. The suspension arrangement will be described later. Steering arms are also provided to effect steering of the vehicle 100. The steering arms may take any suitable form and may comprise ball joints (as shown) or any other mechanism. The skilled person would be readily aware of alternatives which fall within the scope of the present disclosure.

In this embodiment, tilting of the vehicle 100 is effected by means of a hydraulic system formed on the rear wheels such as that described previously. In this embodiment, the front wheel arrangement 550 is provided to effect tilting of a four wheeled vehicle.

Figure 21:
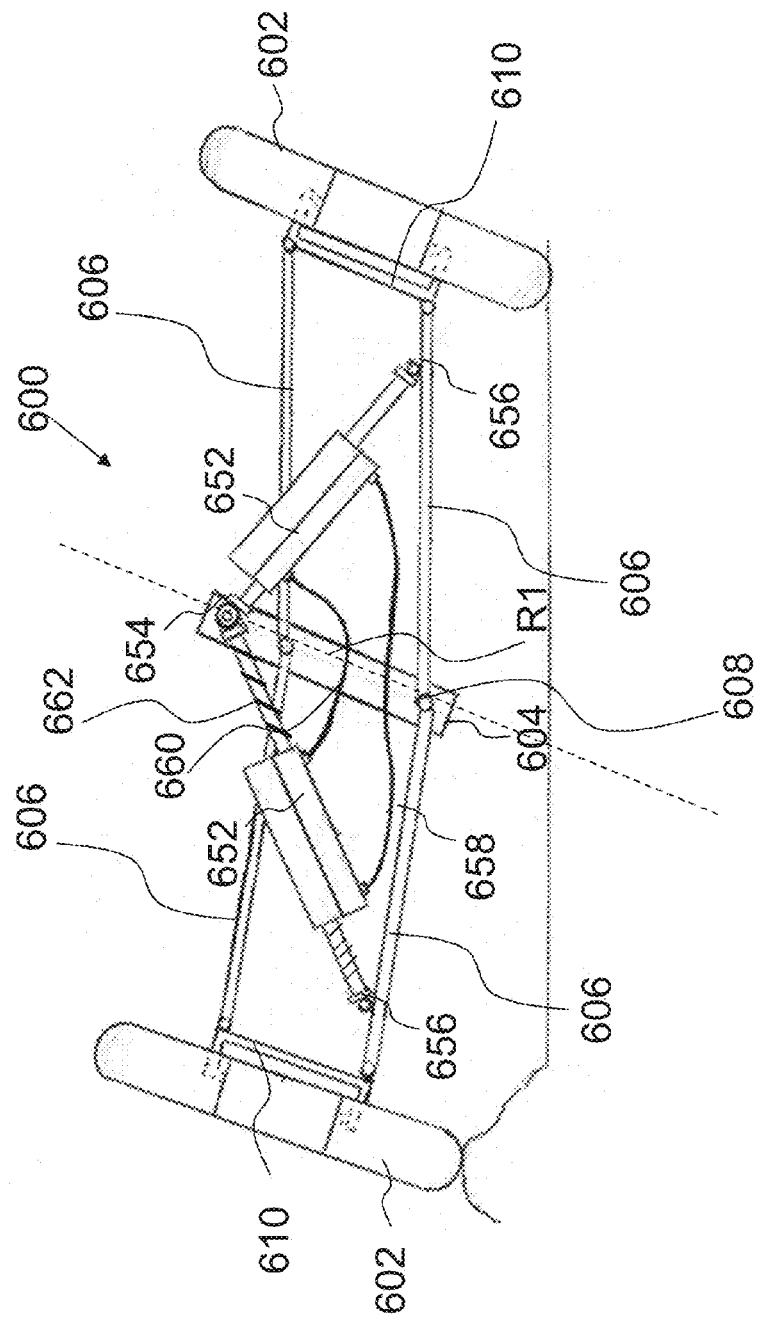
FIG. 21 is a simplified front schematic of an alternative front wheel assembly comprising two front wheels.

FIG. 21 shows a second embodiment of a steering arrangement 600 in which two front wheels 602 are provided. The two front wheels 602 are able to steer, tilt and castor as for the previous steering arrangements 300, 400, 500 comprising only a single front wheel. The steering arrangement 600 comprises a central member 604 which is arranged to rotate about an axis R1-R1 lying parallel to the axis X-X shown in FIG. 1. The central member 604 is arranged to rotate with the remainder of the chassis 102 of the vehicle 100.

Attached to the central member 604 are four A-arms or wishbones 606. Two wishbones 606 are located on opposing upper sides of the central member 604 and are connected by hinges 608. A further two wishbones 606 are hinged at opposing lower sides of the central member 604. In other words, a pair of wishbones 606 extends away from each side of the central member 604. The wishbones 606 connect at their distal ends to wheel hubs 610 which are connected to the wheels 602.

The steering arrangement 600 comprises a pair of front hydraulic cylinders 652. The hydraulic cylinders 652 are structurally similar to the hydraulic cylinders 144 connected to the rear wheels of the vehicle 100 in earlier embodiments. Therefore, each hydraulic cylinder 652 comprises a movable piston (not shown) which divides each hydraulic cylinder 652 into two separate chambers.

Each hydraulic cylinder 652 is connected at one end to the upper end central member 604 by means of a pivotable connection 654, and at a lower end to a respective lower A-arm 606 via a shock absorber 664 as shown in FIG. 17. In other words, the hydraulic cylinders 652 share a common body with the shock absorbers 664.

The two hydraulic cylinders 652 are fluidly connected at lower ends by means of a lower connection pipe 658 and at upper ends by means of an upper connection pipe 660. Therefore, the two hydraulic cylinders 652 are able to move oppositely and in unison as fluid is passed back and forth therebetween to effect tilting of the front wheel arrangement 600.

In one arrangement, the two hydraulic cylinders 652 could be linked with the rear hydraulic cylinders 144 to form a circuit of cylinders connecting the front and rear wheels. Additionally, the pump arrangement 202 could be used to control the operation of the front hydraulic cylinders 652 in addition to the rear hydraulic cylinders 144.

Additionally, a spring 662 may be provided as a biasing means on the hydraulic cylinders 652 to provide a restoring force to the vehicle 100 in order to upright the body of the vehicle 100. This means that, in the absence of any other forces, the body of the vehicle 100 will return to the upright position. In other words, the springs on the hydraulic cylinders provide automatic centering of the vehicle and a failsafe should hydraulic pressure drop in the hydraulic cylinders.

Variations on this arrangement are possible. The parallelogram(s)/trapezoid(s) or 'A' arms/wishbones may be connected to interconnected hydraulic cylinders as shown which operate in a similar manner to those connected to the rear wheels as described in earlier embodiments to allow controlled vehicle tilt and lock from the front of the vehicle. These front hydraulic cylinders may, optionally be used in conjunction with hydraulic cylinders on the rear wheels and be connected to the same hydraulic circuit as the rear hydraulic cylinders.

As an alternative to the propulsion unit 122, electric motors could be incorporated into each hub 610 to drive the front wheels if required. Whilst this will result in additional mass located towards the front of the vehicle, the enhanced stability provided for by the four wheel arrangement mitigates the issues associated with this.

Alternatively, instead of a bevel gear, a worm gear, rack and pinion or hydraulic rams could be provided to effect steering of the vehicle. As a further alternative, two steering arms, one either side of the central member 604 or the central body or chassis axis, could be provided.

Alternatively, the front hydraulic cylinders 652 may be provided on a separate hydraulic circuit to the rear hydraulic cylinders to provide a second failsafe beyond that of the rear hydraulic system. This is particularly important in view of providing a safe vehicle in the event of failure.

Figure 22:
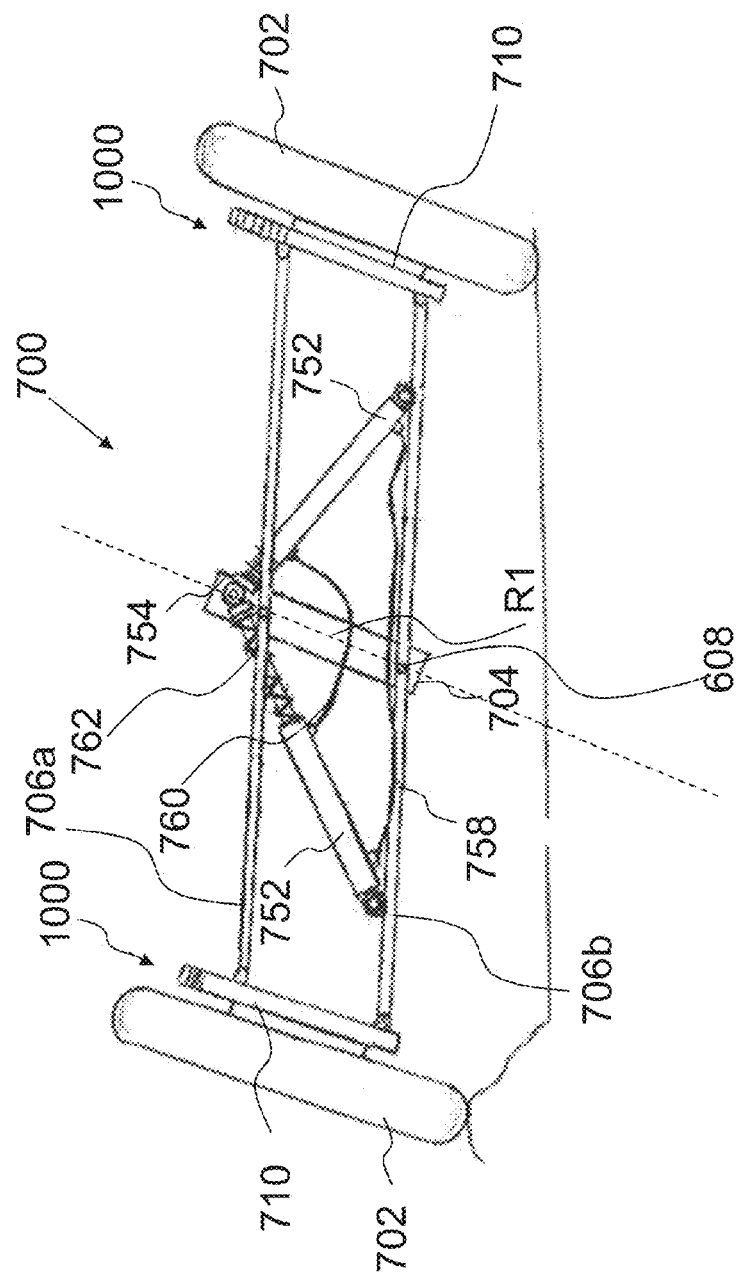
FIG. 22 is a simplified front schematic of a further alternative front wheel assembly comprising two front wheels.
Figure 23:
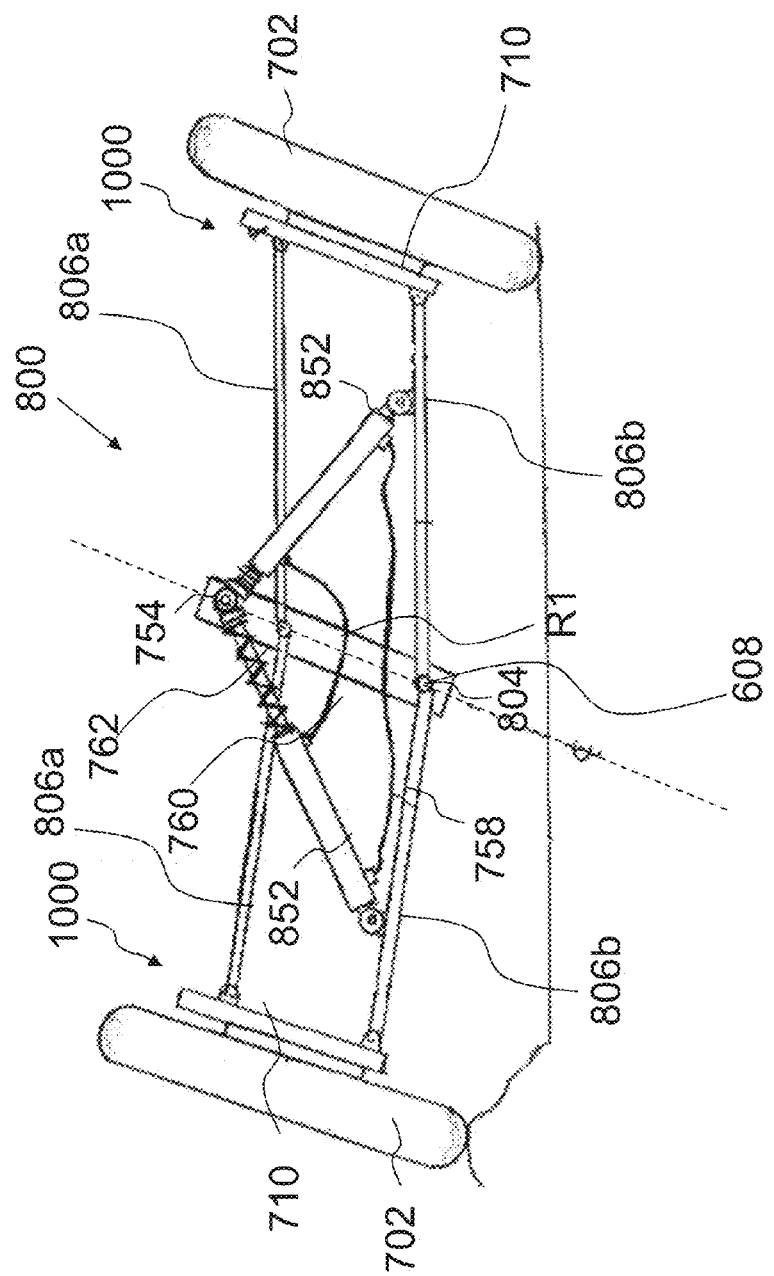
FIG. 23 is a simplified front schematic of a yet further alternative front wheel assembly comprising two front wheels.
Figure 24:
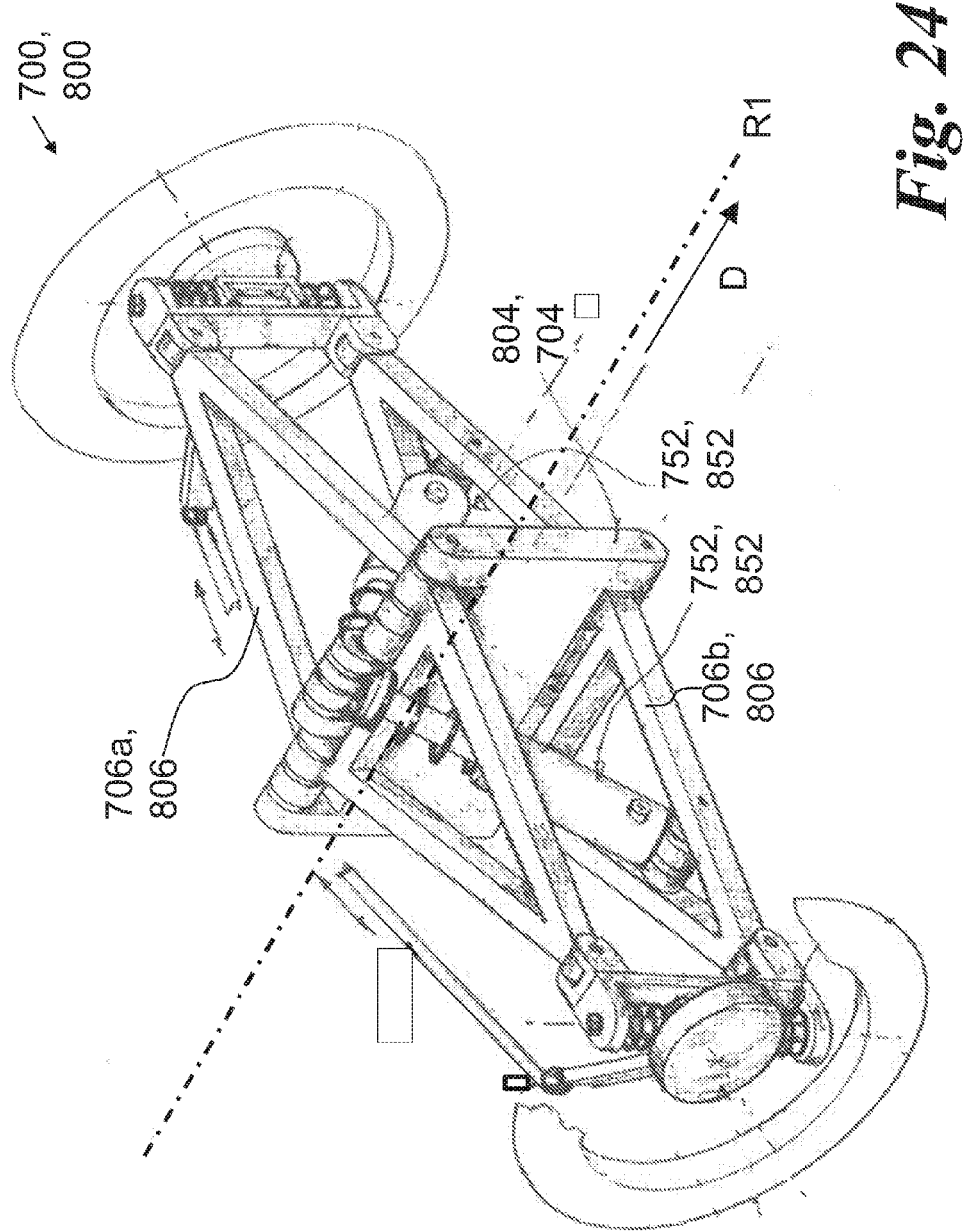
FIG. 24 is an isometric view representative of the embodiments of FIGS. 22 and 23.

FIGS. 22 to 24 show two alternative embodiments of steering arrangements 700, 800 which comprise hydraulic actuation and tilting of the front wheels of the vehicle 100. FIG. 22 shows a front schematic of a steering arrangement 700, FIG. 23 shows a front schematic of a steering arrangement 800 and FIG. 24 shows an isometric view applicable to both steering arrangements 700, 800.

FIG. 22 shows a further alternative embodiment of a steering arrangement 700 in which two front wheels 702 are provided. The two front wheels 702 are able to steer, tilt and castor as for the previous steering arrangements 300, 400, 500 comprising only a single front wheel and steering arrangement 600 comprising two front wheels.

The steering arrangement 700 comprises a central member 704 which is arranged to rotate about an axis R1-R1 lying parallel to the axis X-X shown in FIG. 1. The central member 704 is arranged to rotate with the remainder of the chassis 102 of the vehicle 100.

Pivotally attached to the central member 704 are a pair of connecting arms 706a, 706b. In contrast to the previous embodiment, in this embodiment the upper connecting arm 706a extends directly between the wheel hubs 710. Concomitantly, the lower connecting arm 706b extends between the wheel hubs 710 and connects to the wheel hubs 710 at a position vertically spaced from the connection point of the upper arm 706a. The upper and lower arms 706a, 706b and wheel hubs 710 form a trapezoidal or parallelogram arrangement which can enable efficient tilting of the wheel hubs 710 (and, consequently, the front wheels 702).

The steering arrangement 700 further comprises a pair of front hydraulic cylinders 752. The hydraulic cylinders 752 are structurally similar to the hydraulic cylinder configuration 144 of the first embodiment which is connected to the rear wheels of the vehicle 100. Therefore, each hydraulic cylinder 752 comprises a movable piston (not shown) which divides each hydraulic cylinder 752 into two separate chambers.

Each hydraulic cylinder 752 is connected at one end to the upper end central member 704 by means of a pivotable connection 754, and at a lower end to a respective lower arm 706b as shown in FIG. 18. The two hydraulic cylinders 752 are fluidly connected at lower ends by means of a lower connection pipe 758 and at upper ends by means of an upper connection pipe 760. Therefore, the two hydraulic cylinders 752 are able to move oppositely and in unison as fluid is passed back and forth therebetween to effect tilting of the front wheel arrangement 700.

As for the previous embodiment, the two hydraulic cylinders 752 could be linked with the rear hydraulic cylinders 144 to form a circuit of cylinders connecting the front and rear wheels. Additionally, the pump arrangement 202 could be used to control the operation of the front hydraulic cylinders 752 in addition to the rear hydraulic cylinders 144.

Additionally, a spring 762 may be provided as a biasing means on the hydraulic cylinders 752 to provide a restoring force to the vehicle 100 in order to upright the body of the vehicle 100. This means that, in the absence of any other forces, the body of the vehicle 100 will return to the upright position. In other words, the springs on the hydraulic cylinders provide automatic centering of the vehicle and a failsafe should hydraulic pressure drop in the hydraulic cylinders.

In contrast to the previous embodiment, no shock absorbers are provided adjacent the hydraulic cylinders 652. Instead, shock absorbers 1000 are located on the wheel hubs 710. The shock absorbers 1000 will be described in detail later.

In summary, in this embodiment, each front wheel is connected to the chassis by a pair of support arms, i.e. a single parallelogram/trapezoid when viewed from the front of the vehicle. Alternatively, the wheels can be in a fixed axis on central chassis dual 'A' arm or dual 'wishbone' arrangements. The 'A' arms/wishbones can allow hydraulic cylinders to pass between them to effect tilting of the vehicle. The above single parallelogram/trapezoid can be used with a vehicle tilt mechanism being provided by the rear wheel arrangement as described in previous embodiments.

FIG. 23 shows a further alternative embodiment of a steering arrangement 800. Elements of steering arrangement 800 in common with steering arrangement 700 use the same reference numerals as for the previous embodiment for clarity. In common with the previous embodiment, the steering arrangement 800 comprises two front wheels 702 which are able to steer, tilt and castor as for the previous steering arrangements 300, 400, 500 comprising only a single front wheel and steering arrangement 600, 700 comprising two front wheels.

The steering arrangement 800 comprises a central member 804 which is arranged to rotate about an axis R1-R1 lying parallel to the axis X-X shown in FIG. 1. The central member 804 is arranged to rotate with the remainder of the chassis 102 of the vehicle 100.

Pivotally attached to the central member 804 are a two pairs of connecting arms 806a, 706b. In contrast to the previous embodiment, in this embodiment the upper connecting arms 806a extend between the hubs 710 and the central member 804. Concomitantly, each of the lower connecting arms 806b extends between a respective hub 710 and connects to the central member 804. The upper and lower arms 806a, 806b and hubs 710 form a double trapezoidal or double parallelogram arrangement which can enable efficient tilting of the hubs 710 (and, consequently, the front wheels 702).

The steering arrangement 800 further comprises a pair of front hydraulic cylinders 852. The hydraulic cylinders 852 are structurally similar to the hydraulic cylinders 752 of the previous embodiment and will not be described further here.

As for the previous embodiment, the two hydraulic cylinders 852 could be linked with the rear hydraulic cylinders 144 to form a circuit of cylinders connecting the front and rear wheels. Additionally, the pump arrangement 202 could be used to control the operation of the front hydraulic cylinders 852 in addition to the rear hydraulic cylinders 144.

In summary, in the above embodiments of FIG. 22 to 24, each front wheel is connected to the chassis by at least two support arms, i.e. a single dual parallelogram/trapezoid when viewed from the front of the vehicle. Alternatively, front arms may be provided which articulate about central axis on quadruple 'A' arm or quadruple 'wishbone' arrangement. These arrangements require support from the interconnected hydraulic cylinders to tilt the vehicle 100. In arrangements whereby A-arms/wishbones are provided, the hydraulic cylinders may be arranged such as to pass through the middle of the interconnected wishbones.

Figure 26:
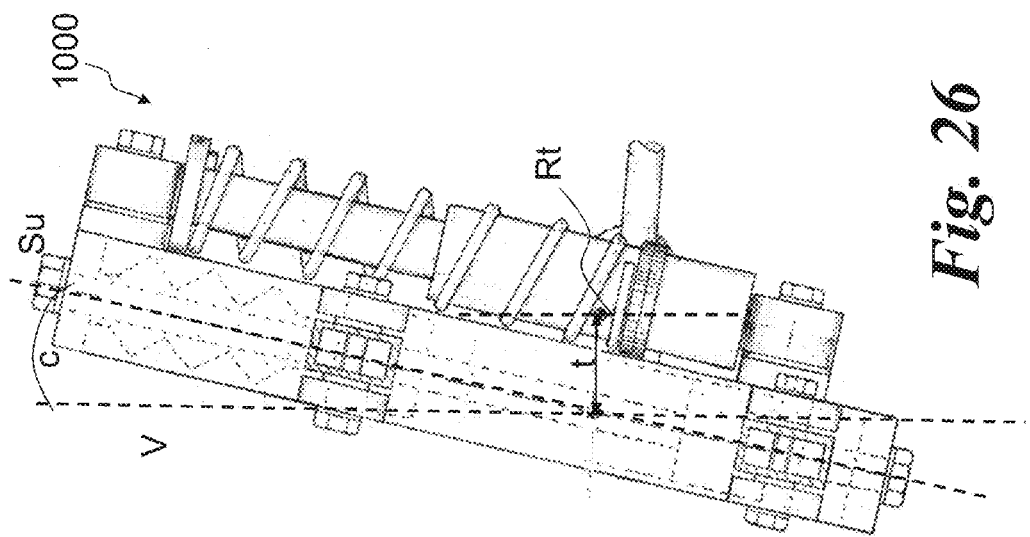
FIG. 26 shows a cross section taken along the line B-B in FIG. 25.
Figure 25:
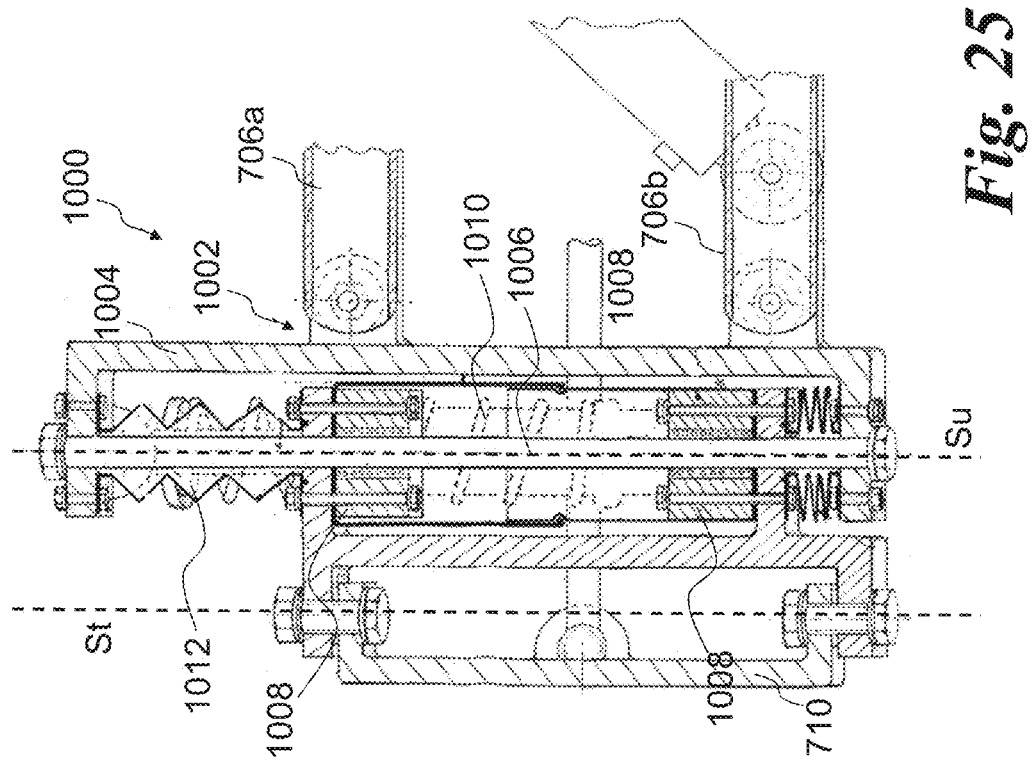
FIG. 25 shows a cross section through a first front wheel suspension arrangement.

An embodiment of a front suspension arrangement 1000 is shown in FIGS. 25 and 26. This is operable for use with the hubs 552, 702 shown previously. In the front suspension arrangement, a sliding suspension unit is provided which enables translation of the hub relative to the A-arms along an axis which is perpendicular to the axis of rotation of the wheels.

A suspension unit 1002 is provided. The suspension unit 1002 comprises a housing 1004 pivotally connected to the upper and lower connecting arms 706a, 706b at one side, and pivotably connected to the hub 710 at another side.

Within the suspension unit 1002 is located a grooved spline rod 1006 about which a plurality of ball splines 1008 are operable to move in a linear fashion. The ball splines 1008 are bolted to the hub 710 and vertical linear movement is permitted between the hub 710 and the hub 1004. A plurality of ball bearings run in a linear race in the grooves in the spline rod 1006 to enable smooth movement between the hub 710 and the hub 1004.

A shock absorber 1010 is provided adjacent and parallel to the spline rod 1006 to provide damping. The rod 1006 and shock absorber 1010 are enclosed by a bellows structure 1012 at the upper and lower ends and by a central enclosure.

In this embodiment, dampers 1010 are provided adjacent a ball spline suspension with a grooved pillar, at the ends of at least one pair of support arms on each side of the vehicle. The whole suspension unit 1002 can be raked at an angle of between −10 degrees and 25 degrees from the vertical in the longitudinal direction of the vehicle. A preferred angle is approximately 15 degrees. Furthermore, the suspension axis may be offset from the wheel centre to allow castoring of the front wheels. Dampers can be controlled by piezo-electric means to give optimum ride characteristics and to lock vehicle 'wobble' movement when stationary for ingress or egress. The angles of dampers, steering hub and other components may vary from those shown in illustration in relation to each other for optimum ride dynamics.

The orientations of the respective axes are shown in FIGS. 25 and 26. As shown in FIG. 25, the steering axis St is laterally offset from the suspension axis Su. In addition, as shown in FIG. 26, the suspension axis is located forwardly of the axis of rotation Rt of the wheel. In a preferred embodiment, this spacing is 20-50 mm. Furthermore, the suspension axis Su is tilted with respect to the vertical direction V by a castor angle c. This may take an angle of between −10 to 25 degrees from the vertical.

Figure 28:
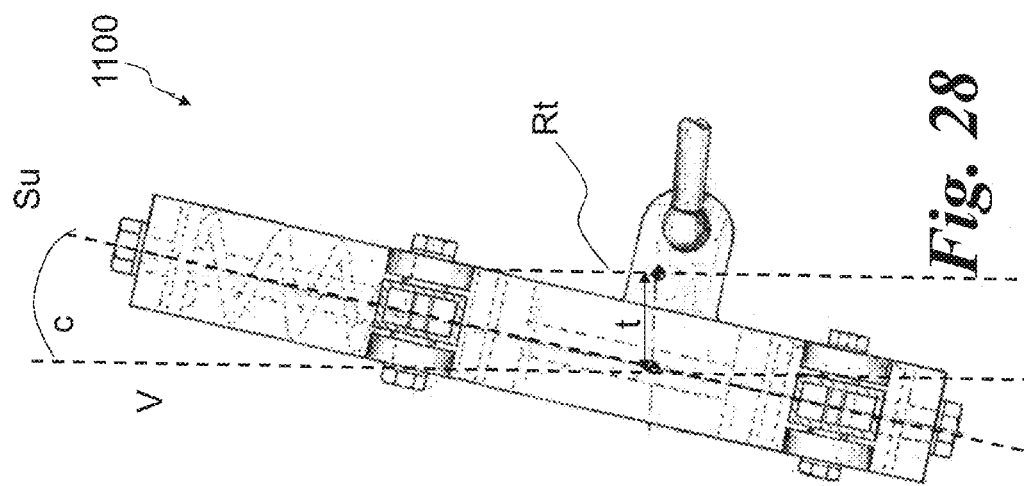
FIG. 28 shows a cross section taken along the line B-B in FIG. 27.
Figure 27:
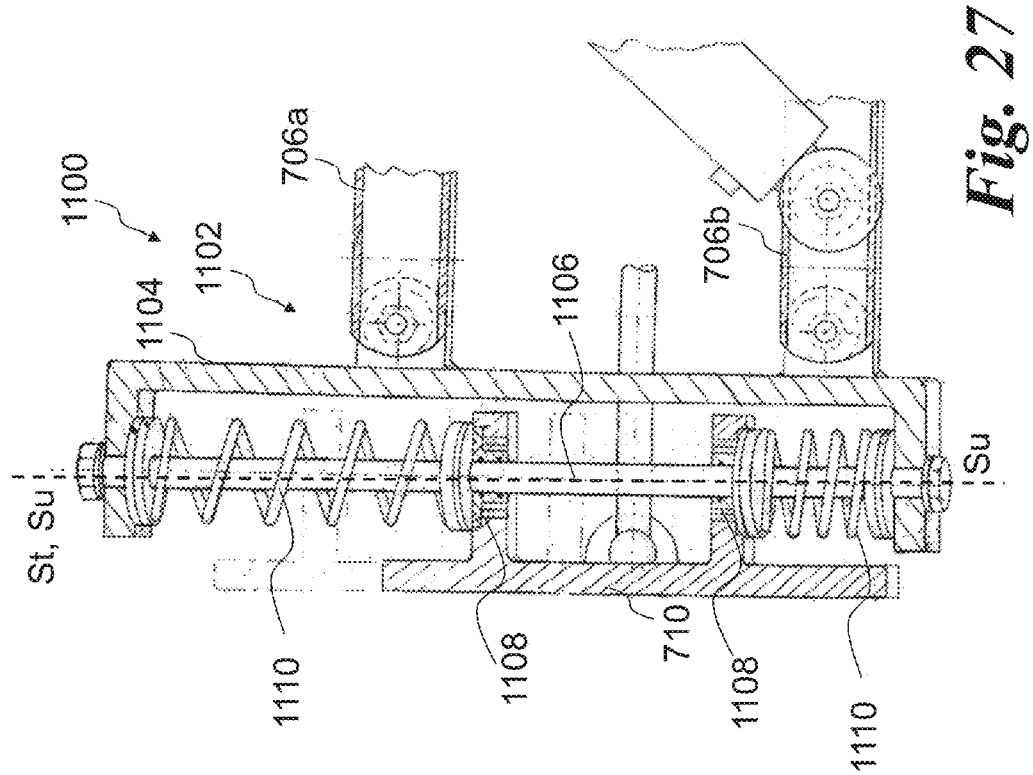
FIG. 27 shows a cross section through a second front wheel suspension arrangement.

Another embodiment of a front suspension arrangement 1100 is shown in FIGS. 27 and 28. This is used with the previous two front wheel arrangement embodiments on the wheel hubs 702. In the previous embodiment, the spline rod forming the linear suspension unit was necessarily separate from the pivot point used to provide the steering of the vehicle.

However, in this embodiment, the rod about which linear translation of the hub 710 relative to the remainder of the vehicle is also operable to effect steering of the vehicle, i.e. the hub 710 can pivot about the longitudinal axis of the rod as well as translating therealong.

In the front suspension arrangement, a suspension unit 1102 is provided. The suspension unit 1102 takes the form of sliding pillar suspension and comprises a hub 1104 pivotally connected to the upper and lower connecting arms 706a, 706b at one side, and rotatably to the wheel hub 710 at another side via a smooth, circular section rod 1106.

The rod 1106 is located within the hub 1104. The hub 710 is connected to the rod 1106 and is operable to translate along the rod 1106. In other words, linear movement is permitted between the hub 710 and the hub 1104. The hub 710 is supported on bushes 1108 which enable linear movement of the hub 710 along the rod 1106 as well as rotational movement about the longitudinal axis of the A pair of dampers 1110 are provided around the rod 1106 to provide damping.

In this embodiment, dampers operating in a parallel plane to each wheel are provided on a sliding pillar suspension between at least one pair of support arms and the vehicle chassis on each side of the vehicle. These are raked and offset from wheel centre to allow castoring of front wheels. The dampers may, optionally, be controlled by piezo-electric means to give optimum ride characteristics and to lock vehicle movement when stationary for ingress or egress. The angles of the dampers, the hub 710 and other components may vary within the scope of the present disclosure. With this embodiment, the centre of the spline rod 1106 may also form the pivot axis for the hub steering, to minimise components and vehicle weight by use of appropriate bushes and seals.

The orientations of the respective axes are shown in FIGS. 27 and 28. As shown in FIG. 27, the steering axis St is coincident with the suspension axis Su. In addition, as shown in FIG. 28, the suspension axis is located forwardly of the axis of rotation Rt of the wheel. In a preferred embodiment, this spacing is 20-50 mm. Furthermore, the suspension axis Su is tilted with respect to the vertical direction V by a castor angle c. This may take an angle of between −10 to 25 degrees from the vertical.

Figure 30:
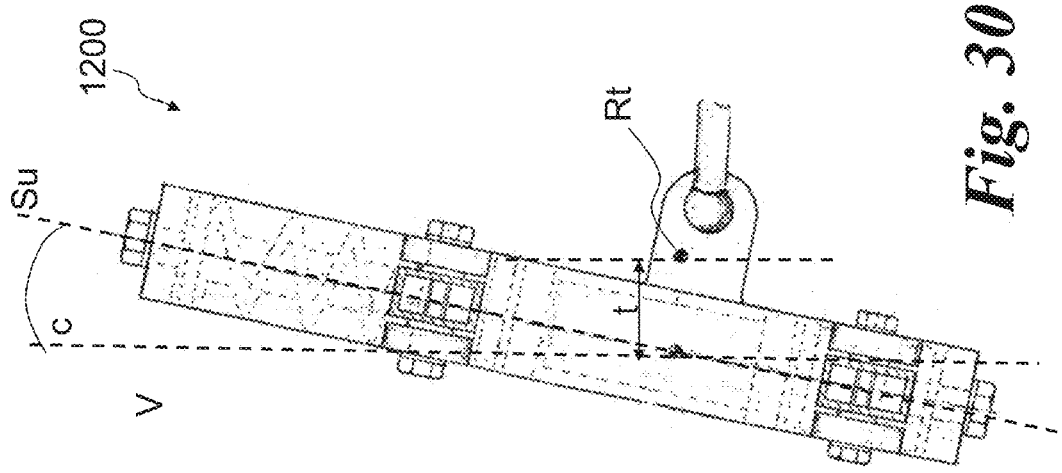
FIG. 30 shows a cross section taken along the line B-B in FIG. 29.
Figure 29:
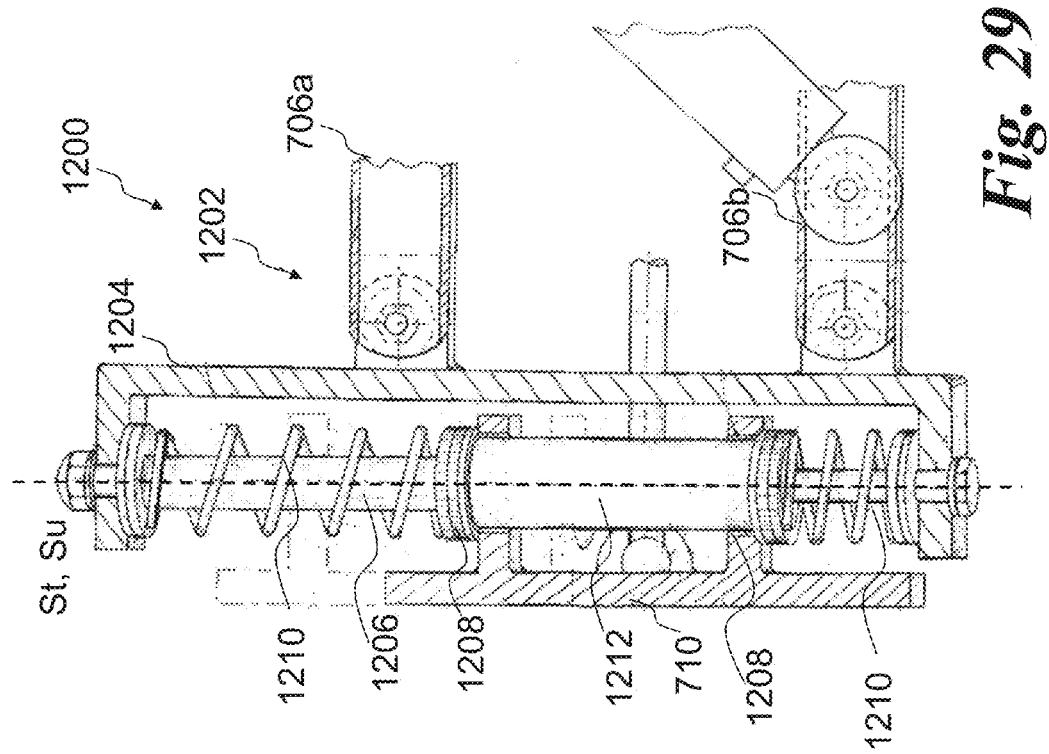
FIG. 29 shows a cross section through a third front wheel suspension arrangement.

A further embodiment of a front suspension arrangement 1200 is shown in FIGS. 29 and 30. This is used with the previous two front wheel arrangement embodiments on the wheel hubs 702. In common with the previous embodiment, the rod about which linear translation of the hub 710 relative to the remainder of the vehicle is also operable to effect steering of the vehicle, i.e. the hub 710 can pivot about the longitudinal axis of the rod as well as translating therealong.

In the front suspension arrangement, a suspension unit 1202 is provided. The suspension unit 1202 takes the form of sliding pillar suspension and comprises a hub 1204 pivotally connected to the upper and lower connecting arms 706a, 706b at one side, and rotatably to the wheel hub 710 at another side via a smooth, circular section rod 1206.

The rod 1206 is located within the hub 1204. The hub 710 is connected to the rod 1206 and is operable to translate along the rod 1206. In other words, linear movement is permitted between the hub 710 and the hub 1204. The hub 710 is supported on bushes 1208 which enable linear movement of the hub 710 along the rod 1206 as well as rotational movement about the longitudinal axis of the A pair of dampers 1210 are provided around the rod 1206 to provide damping.

This embodiment of the front suspension arrangement 1200 is distinguished from previous embodiments by the presence of a further pneumatic (or hydro-pneumatic) component 1212 of the damper. The further damper 1212 may be sealed at both ends with O-rings or wipers and incorporate bushes for rotation. This damper 1212 may provide further damping for, for example, an improvement in secondary ride comfort and reduction of high frequency oscillations induced by a road surface.

In this embodiment, dampers operating in a parallel plane to each wheel are provided over a sliding pillar suspension between at least one pair of support arms and the vehicle chassis on each side of the vehicle. These are raked and offset from wheel centre to allow castoring of front wheels. Dampers can be controlled by piezo-electric means to give optimum ride characteristics and to lock vehicle movement when stationary for ingress or egress. Angles of dampers, steering hub and other components may vary from those shown in illustration in relation to each other for optimum ride dynamics. With this option the centre of the sliding pillar can also form the pivot axis for the hub steering, to minimise components and vehicle weight by use of appropriate bushes and seals.

The orientations of the respective axes are shown in FIGS. 29 and 30. As shown in FIG. 29, the steering axis St is coincident with the suspension axis Su. In addition, as shown in FIG. 30, the suspension axis is located forwardly of the axis of rotation Rt of the wheel. In a preferred embodiment, this spacing is 20-50 mm. Furthermore, the suspension axis Su is tilted with respect to the vertical direction V by a castor angle c. This may take an angle of between −10 to 25 degrees from the vertical.

All the above front suspension arrangements effectively enable the front wheels to act in the manner of two independent motorcycle front forks connected together.

In the above arrangements, the suspension arrangement is located on the wheel hub and provides for substantially vertical damping movement in a direction substantially perpendicular to the axis of rotation of the vehicle's wheels, irrespective of the angle of tilt of the wheels relative to the ground surface. By providing this arrangement, suspension translation is always in a direction perpendicular to the axis of rotation and parallel to the direction of travel of the wheel.

This reduces or even eliminates tyre scrub (i.e. lateral movement of the tyre when the suspension is translating) and mitigates bump steer effects.

In addition, the second and third embodiments provide for an arrangement having lower unsprung mass because fewer components are required to be located on the wheel hub. Additionally, the above arrangements could be used to control the two front skis of a tilting or non-tilting snow mobile, tractor or quadbike etc. The above examples could all have manual steer control but not free to castor operation.

Figure 31:
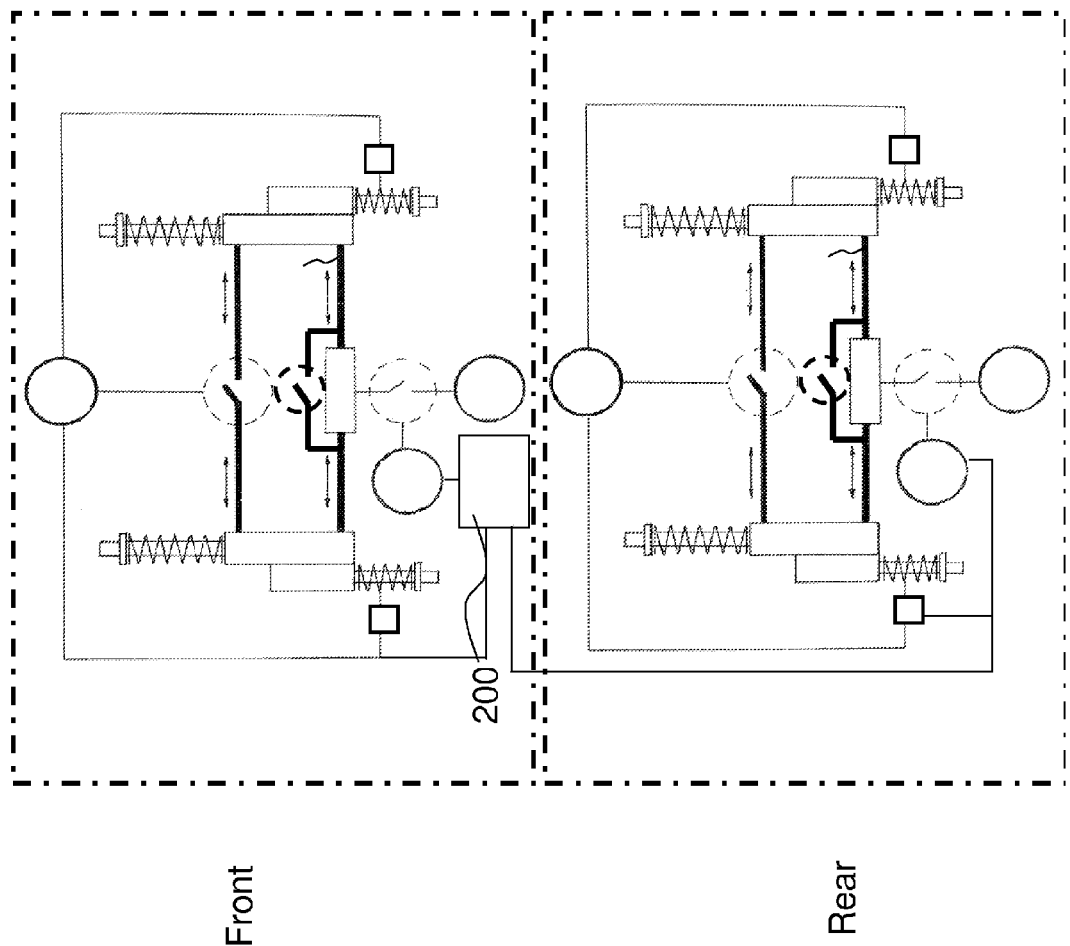
FIG. 31 shows a hydraulic control arrangement similar to FIG. 8 but operable to control both front and rear hydraulic arrangements.

Safety requirements for motor vehicles often requires fail safe systems to be present. Therefore, in certain cases, it may be desirable to provide both front and rear wheel hydraulic systems. FIG. 31 illustrates an arrangement whereby a control arrangement 200 (similar to that of the control arrangement 200 of FIG. 8) can be used to control both front and rear hydraulic systems. In this arrangement, a central controller is operable to control both systems to ensure fail safe operation. It may also be possible to interconnect the hydraulic systems so that a common pump, reservoir and hydraulic circuit is shared between the front and rear hydraulic systems to reduce components. Alternatively, the physical systems may be kept separate to provide further fail safe operation.

Instead of using a single propulsion unit for driving both rear wheels, each rear wheel could be driven by its own dedicated motor. The drive may be direct from the motor, in which case the motor can effectively form the swing arm. Alternatively, the drive may be indirect via a chain, belt or shaft, for example. The front wheel may optionally be driven from its own dedicated motor or from the motor or motors that drive the rear wheels.

It will be appreciated that various components, including for example the differential for the rear wheels, are not shown in the drawings for reasons of clarity only. Whilst the rear wheels of the example described above are shown as being mounted on one side of their respective swing arms 116, the swing arms could be forked with the rear wheels mounted between the forks of the swing arm.

Variations of the above embodiments will be apparent to the skilled person. The precise configuration of hardware and software components may differ and still fall within the scope of the present disclosure. Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

The invention claimed is:

1. A vehicle comprising a chassis, two surface-engaging front wheels, at least one surface-engaging rear wheel and a propulsion unit for driving either the front wheels or the rear wheel or wheels, each front wheel being connected to the chassis by means of a front wheel support assembly, wherein the front wheel support assembly comprises a hydraulic cylinder associated with each front wheel, each hydraulic cylinder comprising:
a housing connected to one of the chassis and the front wheel support assembly; and
a piston connected to the other of the front wheel support assembly and the chassis, the piston being moveable within the housing and arranged to divide the hydraulic cylinder into first and second chambers each having respective ports arranged to allow hydraulic fluid to enter and exit the respective chamber,
the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings to enable the vehicle to tilt;
wherein the chassis further comprises a central member movable therewith; and
wherein the front wheel assembly further comprises:
an upper support member independently pivotably connected to the central member and to a respective wheel hub; and
a lower support member independently pivotably connected to the central member and to a respective wheel hub, wherein at least one of the support members comprises a single member extending between wheel hubs, wherein the front wheel support assembly comprises a pump arrangement configured to pump hydraulic fluid between hydraulic cylinders.

2. A vehicle according to claim 1, wherein at least one of the support members comprises a wishbone arrangement.

3. A vehicle according to claim 1, wherein a control device is provided to enable a user to steer the vehicle and the control device is connected to the wheel hubs by means of one or more pairs of linkage arms or a hydraulic connection.

4. A vehicle according to claim 3, wherein the control device is connected to a steering column, the steering column being connected to the linkage arms by means of a gear linkage.

5. A vehicle according to claim 3, wherein the control device is selectively disengageable such that the front wheels are free to castor.

6. A vehicle according to claim 1, further comprising two surface-engaging rear wheels, each rear wheel being connected to the chassis by a rear wheel support assembly comprising:
a rear wheel support for allowing movement of the respective rear wheel relative to the chassis; and
a rear hydraulic cylinder, the rear hydraulic cylinder comprising:
a housing connected to one of the chassis and the rear wheel support; and
a piston connected to the other of the rear wheel support and the chassis, the piston being moveable within the housing and arranged to divide the hydraulic cylinder into first and second chambers each having respective ports arranged to allow hydraulic fluid to enter and exit the respective chamber,
the ports of the first chambers of each rear hydraulic cylinder being in fluid communication and the ports of the second chambers of each rear hydraulic cylinder being in fluid communication such that movement of hydraulic fluid from the first or second chamber of one rear hydraulic cylinder to the respective first or second chamber of the other rear hydraulic cylinder displaces the pistons of the rear hydraulic cylinders in opposing directions relative to the respective housings.

7. A vehicle according to claim 6, wherein the front hydraulic cylinders and the rear hydraulic cylinders share a common hydraulic circuit.

8. A vehicle according to claim 6, wherein each rear hydraulic cylinder further comprises a hydro-pneumatic damper.

9. A vehicle according to claim 8, wherein each hydro-pneumatic damper comprises a chamber and a flexible membrane, the flexible membrane dividing the chamber into a hydraulic portion and a hydro-pneumatic portion.

10. A vehicle according to claim 9, wherein the hydraulic portion is in fluid communication with the interior of the respective hydraulic cylinder.

11. A vehicle according to claim 1, wherein at least one hydraulic cylinder further comprises resilient means arranged to bias the vehicle towards the upright position.

12. A vehicle according to claim 11, wherein the resilient means comprises a coil spring.

13. A vehicle according to claim 1, further comprising a body connected to said chassis and defining a fully enclosed interior space of the vehicle arranged to accommodate a driver.

14. A vehicle according to claim 1, wherein at least one wheel is arranged to tilt with said chassis in use.

* * * * *